(12) United States Patent
Burns et al.

(10) Patent No.: US 9,734,535 B2
(45) Date of Patent: Aug. 15, 2017

(54) CHARTING MULTIPLE MARKETS

(71) Applicant: Trading Technologies International, Inc., Chicago, IL (US)

(72) Inventors: Michael J. Burns, Riverside, IL (US); Douglas R. Duquette, Glencoe, IL (US); Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 26 days.

(21) Appl. No.: 13/838,444

(22) Filed: Mar. 15, 2013

(65) Prior Publication Data
US 2014/0279345 A1 Sep. 18, 2014

(51) Int. Cl.
*G06Q 40/04* (2012.01)

(52) U.S. Cl.
CPC .................................. *G06Q 40/04* (2013.01)

(58) Field of Classification Search
CPC ........ G06Q 40/00; G06Q 40/04; G06Q 40/06; G06Q 40/025
USPC .......................................................... 705/37
See application file for complete search history.

(56) References Cited

U.S. PATENT DOCUMENTS

| | | | |
|---|---|---|---|
| 6,993,504 B1 | 1/2006 | Friesen et al. | |
| 7,356,501 B2 * | 4/2008 | Churquina | 705/37 |
| 7,389,268 B1 * | 6/2008 | Kemp et al. | 705/39 |
| 7,418,422 B2 | 8/2008 | Burns | |
| 7,523,064 B2 * | 4/2009 | Burns et al. | 705/37 |
| 7,562,047 B2 | 7/2009 | Friesen et al. | |
| 7,571,134 B1 | 8/2009 | Burns et al. | |
| 7,574,397 B1 | 8/2009 | Kline et al. | |
| 7,711,630 B2 | 5/2010 | O'Connor et al. | |
| 8,131,618 B2 * | 3/2012 | Weinstein | 705/35 |
| 8,494,941 B2 * | 7/2013 | Aymeloglu et al. | 705/36 R |
| 2009/0307127 A1 * | 12/2009 | Burns et al. | 705/37 |
| 2010/0332379 A1 * | 12/2010 | Ram et al. | 705/37 |
| 2011/0251942 A1 * | 10/2011 | Rosenthal et al. | 705/37 |
| 2012/0005045 A1 * | 1/2012 | Baker | 705/27.2 |

OTHER PUBLICATIONS

International Search Report of International Application No. PCT/US2014/016623, dated Jun. 28, 2014 (mailed Jul. 9, 2014).

* cited by examiner

*Primary Examiner* — Eric T Wong
*Assistant Examiner* — David P Sharvin
(74) *Attorney, Agent, or Firm* — McDonnell Boehnen Hulbert & Berghoff LLP

(57) ABSTRACT

The present embodiments relate to charting multiple markets. In some embodiments, charting multiple markets may include receiving market data for a plurality of tradeable objects. The plurality of tradeable objects may include an anchor object and at least one non-anchor object. The market data may include anchor object price data for the anchor object and non-anchor price data for the at least one non-anchor object. The non-anchor object price data may be converted based on the anchor object price data such that converted non-anchor object price data has a price scale of the anchor object price data. The anchor object price data and the non-anchor object price data may be displayed along a normalized price axis.

15 Claims, 31 Drawing Sheets

Scenario 1

|  | multiplier | delta |
|---|---|---|
| 402 AS_HOCL | 0.01 | |
| 404 CME HO | 0.0042 | 96.458 |
| 406 CME CL | 0.01 | 58.8 |

Bar to Bar Tick Adjustments

410

|  | AS_HOCL | HO | | CL | |
|---|---|---|---|---|---|
|  | Raw | Raw | CNVRT | Raw | CNVRT |
| High | 37.72 | 31950 | 37.73 | 9655 | 37.75 |
| Ask | 37.70 | 31944 | 37.71 | 9650 | 37.70 |
| Mid | 37.69 | 31940 | 37.69 | 9649 | 37.69 |
| Bid | 37.68 | 31936 | 37.67 | 9648 | 37.68 |
| Low | 37.65 | 31930 | 37.65 | 9643 | 37.63 |

Bar to Bar Tick Adjustments

| | -5 | 5 | | 10 | | -4 | -12 | | -8 | |
|---|---|---|---|---|---|---|---|---|---|---|
| | 420 | | | | | 430 | | | | |
|  | AS_HOCL | HO | | CL | | AS_HOCL | HO | | CL | |
|  | Raw | Raw | CNVRT | Raw | CNVRT | Raw | Raw | CNVRT | Raw | CNVRT |
| High | 37.67 | 31955 | 37.75 | 9665 | 37.85 | 37.63 | 31943 | 37.70 | 9657 | 37.77 |
| Ask | 37.65 | 31949 | 37.73 | 9660 | 37.80 | 37.61 | 31937 | 37.68 | 9652 | 37.72 |
| Mid | 37.64 | 31945 | 37.71 | 9659 | 37.79 | 37.60 | 31933 | 37.66 | 9651 | 37.71 |
| Bid | 37.63 | 31941 | 37.69 | 9658 | 37.78 | 37.59 | 31929 | 37.64 | 9650 | 37.70 |
| Low | 37.60 | 31935 | 37.67 | 9653 | 37.73 | 37.56 | 31923 | 37.62 | 9645 | 37.65 |

| | 2 | 4 | | 2 | | -6 | -9 | | -3 | |
|---|---|---|---|---|---|---|---|---|---|---|
| | 440 | | | | | 450 | | | | |
|  | AS_HOCL | HO | | CL | | AS_HOCL | HO | | CL | |
|  | Raw | Raw | CNVRT | Raw | CNVRT | Raw | Raw | CNVRT | Raw | CNVRT |
| High | 37.65 | 31947 | 37.72 | 9659 | 37.79 | 37.59 | 31938 | 37.68 | 9656 | 37.76 |
| Ask | 37.63 | 31941 | 37.69 | 9654 | 37.74 | 37.57 | 31932 | 37.66 | 9651 | 37.71 |
| Mid | 37.62 | 31937 | 37.68 | 9653 | 37.73 | 37.56 | 31928 | 37.64 | 9650 | 37.70 |
| Bid | 37.61 | 31933 | 37.66 | 9652 | 37.72 | 37.55 | 31924 | 37.62 | 9649 | 37.69 |
| Low | 37.58 | 31927 | 37.64 | 9647 | 37.67 | 37.52 | 31918 | 37.60 | 9644 | 37.64 |

FIG. 4A

Scenario 2

|  | multiplier | delta |
|---|---|---|
| 402 AS_HOCL | 0.01 | |
| 404 CME HO | 0.0042 | 96.52 |
| 406 CME CL | 0.01 | 58.91 |

410

| Bar to Bar Tick Adjustments | | | | | | |
|---|---|---|---|---|---|---|
| | AS_HOCL | HO | | CL | | |
| | Raw | Raw | CNVRT | Raw | CNVRT | |
| High | 37.72 | 31950 | 37.67 | 9655 | 37.64 | |
| Ask | 37.70 | 31944 | 37.65 | 9650 | 37.59 | |
| Mid | 37.69 | 31940 | 37.63 | 9649 | 37.58 | |
| Bid | 37.68 | 31936 | 37.61 | 9648 | 37.57 | |
| Low | 37.65 | 31930 | 37.59 | 9643 | 37.52 | |

420 / 430

| | -5 | | 5 | | | 10 | | | -4 | | -12 | | | -8 | | |
|---|---|---|---|---|---|---|---|---|---|---|---|---|---|---|---|---|
| | AS_HOCL | | HO | | | | CL | | AS_HOCL | | HO | | | CL | | |
| | Raw | | Raw | CNVRT | | Raw | CNVRT | | Raw | | Raw | CNVRT | | Raw | CNVRT | |
| High | 37.67 | | 31955 | 37.69 | | 9665 | 37.74 | | 37.63 | | 31943 | 37.64 | | 9657 | 37.66 | |
| Ask | 37.65 | | 31949 | 37.67 | | 9660 | 37.69 | | 37.61 | | 31937 | 37.62 | | 9652 | 37.61 | |
| Mid | 37.64 | | 31945 | 37.65 | | 9659 | 37.68 | | 37.60 | | 31933 | 37.60 | | 9651 | 37.60 | |
| Bid | 37.63 | | 31941 | 37.63 | | 9658 | 37.67 | | 37.59 | | 31929 | 37.58 | | 9650 | 37.59 | |
| Low | 37.60 | | 31935 | 37.61 | | 9653 | 37.62 | | 37.56 | | 31923 | 37.56 | | 9645 | 37.54 | |

440 / 450

Bar to Bar Tick Adjustments

| | -5 | 5 | | 10 | | -4 | -12 | | -8 | |
|---|---|---|---|---|---|---|---|---|---|---|
| | AS_HOCL | HO | | CL | | AS_HOCL | HO | | CL | |
| | Raw | Raw | CNVRT | Raw | CNVRT | Raw | Raw | CNVRT | Raw | CNVRT |
| High | 37.65 | 31947 | 37.66 | 9659 | 37.68 | 37.59 | 31938 | 37.62 | 9656 | 37.65 |
| Ask | 37.63 | 31941 | 37.63 | 9654 | 37.63 | 37.57 | 31932 | 37.60 | 9651 | 37.60 |
| Mid | 37.62 | 31937 | 37.62 | 9653 | 37.62 | 37.56 | 31928 | 37.58 | 9650 | 37.59 |
| Bid | 37.61 | 31933 | 37.60 | 9652 | 37.61 | 37.55 | 31924 | 37.56 | 9649 | 37.58 |
| Low | 37.58 | 31927 | 37.57 | 9647 | 37.56 | 37.52 | 31918 | 37.54 | 9644 | 37.53 |

FIG. 4C

Scenario 3

| | multiplier | delta |
|---|---|---|
| 402 AS_HOCL | 0.01 | 96.538 |
| 404 CME HO | 0.0042 | 58.94 |
| 406 CME CL | 0.01 | |

Bar to Bar Tick Adjustments

410

| | AS_HOCL | HO | | | CL | | |
|---|---|---|---|---|---|---|---|
| | Actual | Raw | CNVRT | | Raw | CNVRT | |
| High | 37.72 | 31950 | 37.65 | | 9655 | 37.61 | |
| Ask | 37.70 | 31944 | 37.63 | | 9650 | 37.56 | |
| Mid | 37.69 | 31940 | 37.61 | | 9649 | 37.55 | |
| Bid | 37.68 | 31936 | 37.59 | | 9648 | 37.54 | |
| Low | 37.65 | 31930 | 37.57 | | 9643 | 37.49 | |

| | -5 | 5 | | 10 | | | -4 | -12 | | -8 | |
|---|---|---|---|---|---|---|---|---|---|---|---|
| 420 | AS_HOCL | HO | | CL | | | 430 AS_HOCL | HO | | CL | |
| | Actual | Raw | CNVRT | Raw | CNVRT | | Actual | Raw | CNVRT | Raw | CNVRT |
| | 37.67 | 31955 | 37.67 | 9665 | 37.71 | | 37.63 | 31943 | 37.62 | 9657 | 37.63 |
| | 37.65 | 31949 | 37.65 | 9660 | 37.66 | | 37.61 | 31937 | 37.60 | 9652 | 37.58 |
| | 37.64 | 31945 | 37.63 | 9659 | 37.65 | | 37.60 | 31933 | 37.58 | 9651 | 37.57 |
| | 37.63 | 31941 | 37.61 | 9658 | 37.64 | | 37.59 | 31929 | 37.56 | 9650 | 37.56 |
| | 37.60 | 31935 | 37.59 | 9653 | 37.59 | | 37.56 | 31923 | 37.54 | 9645 | 37.51 |

Bar to Bar Tick Adjustments

| | -5 | 5 | | 10 | | | -4 | -12 | | -8 | |
|---|---|---|---|---|---|---|---|---|---|---|---|
| 440 | AS_HOCL | HO | | CL | | | 450 AS_HOCL | HO | | CL | |
| | Actual | Raw | CNVRT | Raw | CNVRT | | Actual | Raw | CNVRT | Raw | CNVRT |
| High | 37.65 | 31947 | 37.64 | 9659 | 37.65 | | 37.59 | 31938 | 37.60 | 9656 | 37.62 |
| Ask | 37.63 | 31941 | 37.61 | 9654 | 37.60 | | 37.57 | 31932 | 37.58 | 9651 | 37.57 |
| Mid | 37.62 | 31937 | 37.60 | 9653 | 37.59 | | 37.56 | 31928 | 37.56 | 9650 | 37.56 |
| Bid | 37.61 | 31933 | 37.58 | 9652 | 37.58 | | 37.55 | 31924 | 37.54 | 9649 | 37.55 |
| Low | 37.58 | 31927 | 37.56 | 9647 | 37.53 | | 37.52 | 31918 | 37.52 | 9644 | 37.50 |

FIG. 4E

602 -- CME CL Jan 13
604 -- CME HO Jan 13
606 -- CME RB Jan 13

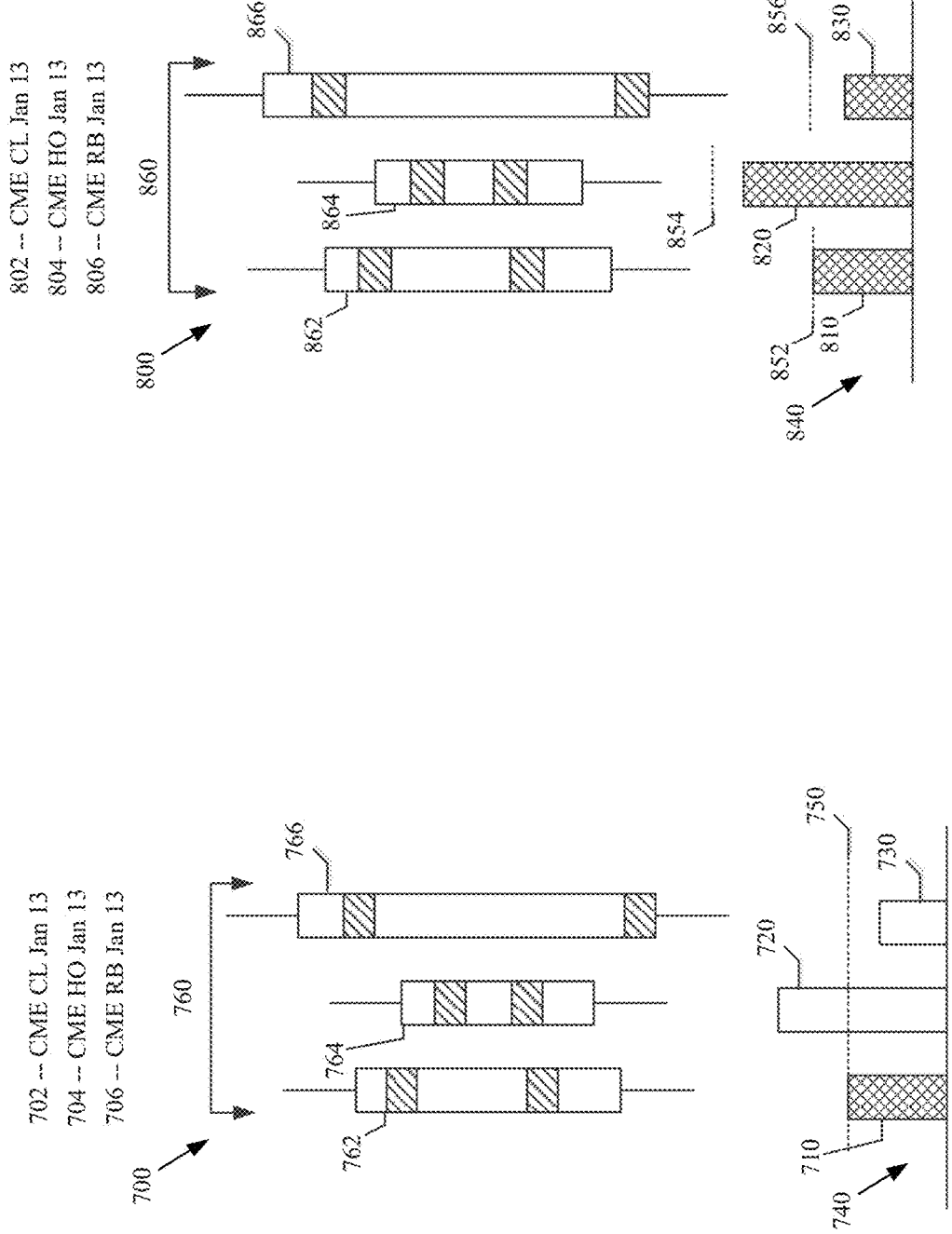

CHARTING MULTIPLE MARKETS

BACKGROUND

The present embodiments relate to charting multiple markets.

An electronic trading system generally includes a trading device in communication with an electronic exchange. The electronic exchange transmits market data to the trading device. Market data includes, for example, price data, market depth data, last traded quantity data, and/or other data related to a market for a tradeable object. In some electronic trading systems, the trading device sends trade orders to the electronic exchange. A trade order may include, for example, a price, a quantity, one or more order thresholds or limits, and/or other data provided to the electronic exchange and related to transactions involving one or more of the tradeable objects. Upon receiving a trade order, the electronic exchange may enter the trade order into an exchange order book and attempt to match quantity of the trade order with quantity of one or more contra-side trade orders.

BRIEF DESCRIPTION OF THE DRAWINGS

Certain embodiments are disclosed with reference to the following drawings.

FIGS. 4A-4F illustrate exemplary scenarios of re-aligning a relationship display based on selection of different alignment bars.

FIG. 7 illustrates a block diagram representative of generating a new relationship bar.

FIG. 8 illustrates a block diagram representative of generating a new relationship bar.

Figure 1:
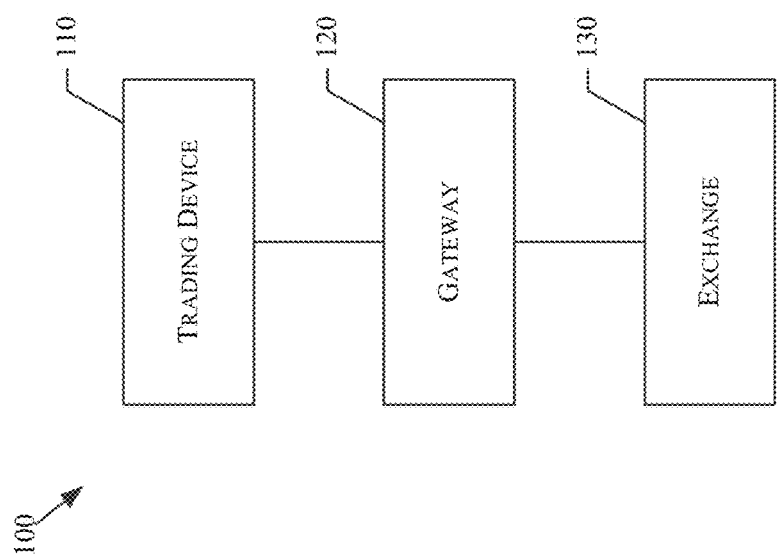
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DESCRIPTION

The present embodiments relate to systems, devices, and methods for charting multiple markets. In some embodiments, charting multiple markets may include visually representing one or more relationship data sets based on an alignment data set. In some embodiments, this may include normalizing one or more non-anchor object prices based on an alignment price of an alignment anchor object. Normalizing the one or more non-anchor object prices may include determining a normalization delta for each of the non-anchor objects. The normalization delta may be based on the alignment price of the alignment anchor object. Normalized prices for the non-anchor objects may be determined based on these normalization deltas. As a result, because the normalized prices are dependent on the alignment price of the alignment anchor object, these normalized prices are tied to and may be compared to the respective prices of the anchor object.

In some embodiments, charting multiple markets may include displaying market data for multiple tradeable objects on a chart. Market data for certain tradeable objects is normalized before being charted. For example, the prices of one or more non-anchor objects may be converted to a price scale of an anchor object. The anchor prices and converted non-anchor prices may be displayed relative to a normalized price axis. Conversion of non-anchor prices allows a common comparison of typically disparate data.

In some embodiments, displaying multiple markets may include displaying a plurality (e.g., two or more) of tradeable object bars. A tradeable object bar may represent a tradeable object. The anchor prices and converted non-anchor prices for the various tradeable objects may define the graphical characteristics (e.g., height, location, etc.) of the tradeable object bars. As a result, the tradeable object bars may graphically represent the anchor prices and converted non-anchor prices and allow for comparison of the underlying tradeable objects (e.g., the relationship between those tradeable objects).

In some embodiments, a relationship bar may be displayed on a relationship display. A relationship bar may include multiple tradeable object bars. The relationship bars may be displayed relative to a normalized relationship axis.

In some embodiments, a new relationship bar may be generated when attributes of an anchor object reach a trigger level. For example, the trigger level may be defined as a traded volume level. Accordingly, when the traded volume of the anchor object reaches the traded volume level, a new relationship bar may be generated.

In some embodiments, charting multiple markets may include receiving market data for a plurality of tradeable objects. The plurality of tradeable objects may include an anchor object and at least one non-anchor object. The market data may include anchor object price data for the anchor object and non-anchor price data for the at least one non-anchor object. The non-anchor object price data may be converted based on the anchor object price data such that converted non-anchor object price data has a price scale of the anchor object price data. The anchor object price data and the non-anchor object price data may be displayed along a normalized price axis.

In some embodiments, a tangible computer readable storage medium includes a set of instructions for execution by a processor. The set of instructions, when executed, implement a method for charting multiple markets. The method may include receiving market data for a plurality of tradeable objects. The plurality of tradeable objects may include an anchor object and at least one non-anchor object. The market data may include anchor object price data for the anchor object and non-anchor price data for the at least one non-anchor object. The non-anchor object price data may be converted based on the anchor object price data such that converted non-anchor object price data has a price scale of the anchor object price data. The anchor object price data and the non-anchor object price data may be displayed along a normalized price axis.

In some embodiments, a method for converting non-anchor price data includes receiving market data for a plurality of tradeable objects. The plurality of tradeable objects includes an anchor object and a non-anchor object. The market data may include anchor object price data for the anchor object and non-anchor price data for the non-anchor object. A normalization delta may be calculated for the non-anchor object using an anchor price of the anchor object. The non-anchor object price data may be converted based on the anchor price of the anchor object. The anchor object price data and the converted non-anchor object price data may be charted on a bar chart having a normalized price axis.

In some embodiments, a method triggering a new relationship bar includes receiving market data for a plurality of tradeable objects. The plurality of tradeable objects may include a trigger object. The method may also include displaying a bar chart including a normalized price axis and displaying a first relationship bar on the bar chart. The first relationship bar may include a first plurality of tradeable object bars that represent the plurality of tradeable objects during a first period of time and are plotted and move in accordance with the normalized price axis. The method may also include displaying a trigger level interface that displays market data for the trigger object relative to a trigger level indicator. The trigger level indicator indicates market data relative to a trigger level that triggers the generation of a second relationship bar when market data satisfies the trigger level.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

FIG. 1 illustrates a block diagram representative of an example electronic trading system 100 in which certain embodiments may be employed. The electronic trading system 100 includes a trading device 110, a gateway 120, and an exchange 130. The trading device 110 is in communication with the gateway 120. The gateway 120 is in communication with the exchange 130. The trading device 110 is in communication with the exchange 130 via the gateway 120. As used herein, the phrase "in communication" encompasses direct communication and/or indirect, wired and/or wireless communication through one or more intermediary components. The exemplary electronic trading system 100 depicted in FIG. 1 may include or be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130. The trading device 110 may be used to send order messages to the exchange 130.

A tradeable object is anything that may be traded. For example, a certain quantity of a tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

A tick size is the smallest increment on which the tradeable object may trade. The tick size may depend on the particular tradeable object. The tick size is typically set by the host exchange, for example, for exchange traded tradeable objects and by a user, for example, for synthetic tradeable objects. Different tradeable objects may have different tick sizes. For example, Light Sweet Crude Oil futures are traded on the CME Globex platform, have product symbol of "CL," have a contract unit of 1,000 barrels, and have a minimum fluctuation (e.g., tick size) of $0.01 U.S. per barrel. RBOB Gasoline futures are traded on the CME Globex platform, have product symbol of "RB," have a contract unit of 42,000 gallons, and have a minimum fluctuation (e.g., tick size) of $0.0001 U.S. per gallon. New York Harbor No. 2 Heating Oil futures are traded on the CME Globex platform, have product symbol of "HO," have a contract unit of 42,000 gallons, and have a minimum fluctuation (e.g., tick size) of $0.0001 U.S. per gallon. CL is pennies per barrel. HO and RB are 100ths of pennies per gallon.

Market data may include data about a market for a tradeable object. A market relates to the exchange of or attempt to exchange one or more tradeable objects. For example, market data may include the inside market, market depth, last traded price ("LTP"), a last traded quantity ("LTQ"), tick size, other information relating to a market for a tradeable object, or a combination thereof. The inside market is the lowest available ask price (best offer) and the highest available bid price (best bid) in the market for a particular tradable object. The inside market may be identified for one or more particular point in time (since the inside market may vary over time). Market depth refers to quantities available at the inside market and at other prices away from the inside market. Because quantity may not be available at one or more prices, there may be "gaps" in market depth.

A data feed may be considered a series of one or more messages. Market data may be provided in a data feed. Different types of data feeds, such as a price data feeds, order data feeds, fill data feeds, or any other now known or later developed data feeds may be generated and/or distributed. A price data feed may include any or all of the inside market, market depth, last traded price, and/or last traded quantity. In some examples, the data in a price data feed may not be specific to a particular market participant. As such, the price data feed may be provided to a plurality of market participants, whether or not these market participants are related. A price data feed may be modified in accordance with an embodiment. In other examples, the data in a price data feed may be specific to a particular market participant and provided to that market participant.

Spread trading is one strategy for buying and selling multiple tradeable objects. Spread trading may attempt to capitalize on changes or movements in the relationships between the tradeable objects in the trading strategy. As another example, one, some, or all of the tradeable objects included in the tradeable object relationship may not be bought and/or sold. Instead, the tradeable object relationship may be used to provide information about other tradeable objects. For instance, a relationship between tradeable objects A, B, and C may be used to provide information about tradeable object D, which may then be bought and/or sold based on the relationship between tradeable objects A, B, and C.

In some embodiments, the trading device 110 may include a tradeable object relationship application (which may be referred to as a "relationship application"). The relationship application may include instructions that may be executed in accordance with one or more of the embodiments herein. For example, a relationship application may include instructions for displaying multiple markets along a normalized price axis in accordance with an embodiment. The relationship application may align tradeable objects in an alignment bar and then align the tradeable objects in the non-alignments based on the alignment bar (e.g., relative to the alignment bar). In another example, a relationship application may include instructions for displaying multiple normalized relationship axes. In yet another example, a relationship application may include instructions for generating a new relationship bar when attributes of one or more trigger objects reaches a trigger level.

An electronic exchange or a market data intermediary may publish a data feed. Electronic exchanges or market data intermediaries may provide market data in different formats. For example, in some embodiments, there is a decimal location indicated in the data received from the feed source and in some embodiments there is no decimal. By way of illustration, in some feeds CME Globex data may not include a decimal (e.g., they publish in 1's). Whereas, in some feeds ICE market data may include a decimal (e.g., they publish in 0.01's). Accordingly, CL and ICE WTI, which is the ICE equivalent of CL, for example, tick in pennies or $0.01, but the feed for ICE market data publishes $0.01 ticks whereas the feed's CME market data publishes 1's so ICE price is 90.25 and CME's price is 9025. Being aware of decimal point location or absence in any particular feed source is important when choosing configuration parameters (such as multipliers) in order to properly reflect the user's preferences when comparing relationships amongst tradeable objects.

A trading device may receive market data. The market data may be distributed by and received from an electronic exchange or a market data intermediary. A market data intermediary may include a platform that collects market data from and then distributes the market data. A market data intermediary may aggregate market data from one or more electronic exchanges and then distribute the aggregated market data. For example, the trading device 110 of FIG. 1 may receive market data from exchange 130 of FIG. 1. The trading device may analyze and/or store the market data. For example, the trading device may receive a market data feed that includes data related to various tradeable objects (e.g., all or some of the tradeable objects traded and/or listed at or hosted by the CME). However, the trading device may store only the market data related to certain tradeable objects. For instance, the trading device may store market data related to tradeable objects 202, 204, 206 of FIG. 2. In some embodiments, the trading device may store all of the market data.

i. Multiple Markets Charted on a Normalized Relationship Axis

Figure 2:
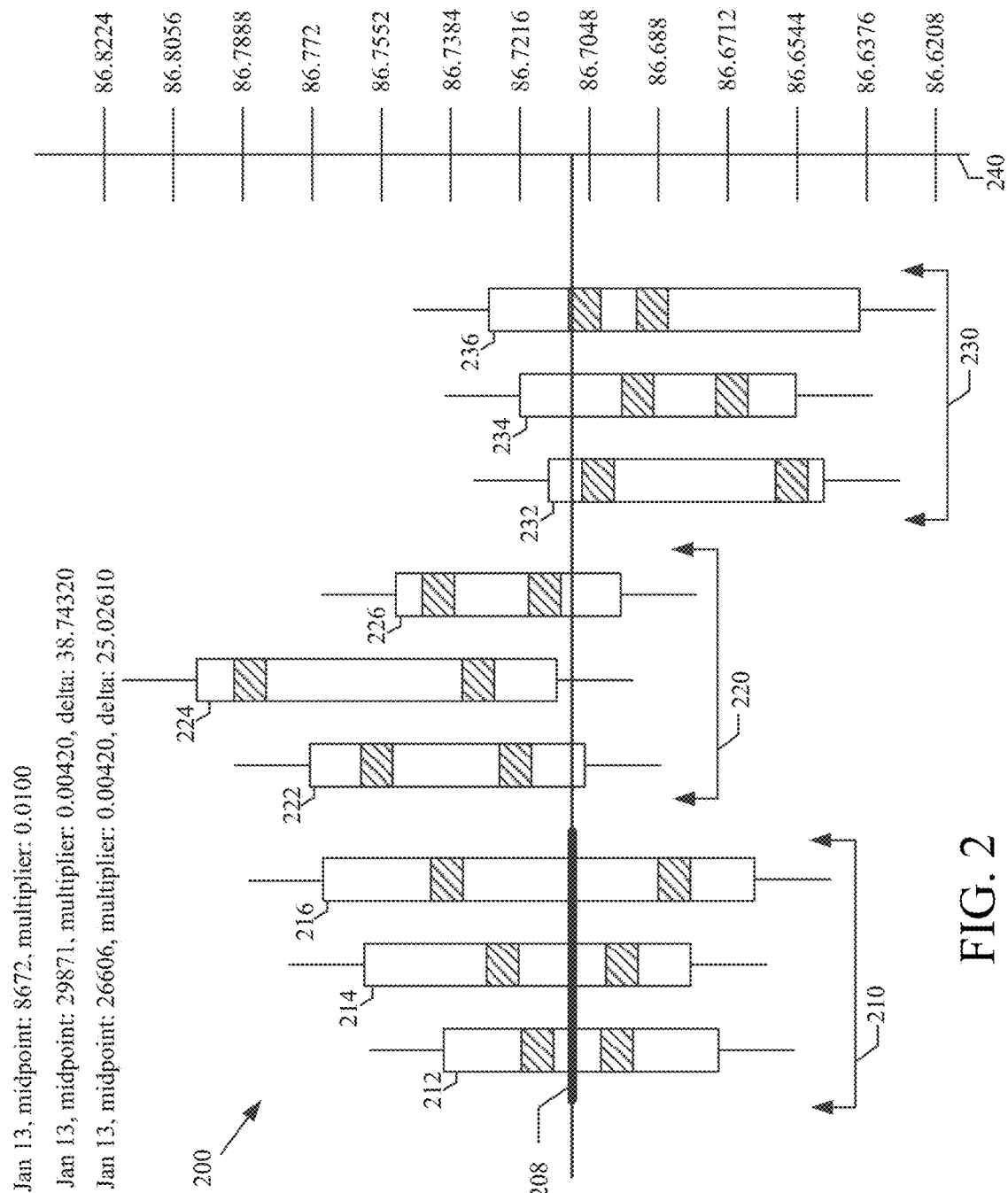
FIG. 2 illustrates a diagram representative of an exemplary relationship display.

FIG. 2 illustrates a relationship display 200. The relationship display 200 may be configured to chart multiple markets. For example, tradeable objects 202, 204, and 206 may be charted on the relationship display. Tradeable object 202 is the January 2013 Light Sweet Crude Oil (CL) futures traded at the CME, tradeable object 204 is the January 2013 Heating Oil (HO) futures traded at the CME, and tradeable object 206 is the January 2013 RBOB Gasoline (RB) futures traded at the CME.

The relationship display 200 includes relationship bars 210, 220, 230 that include tradeable object bars 212-216, 222-226, and 232-236. A tradeable object bar represents a market for at least one tradeable object, for example, over a period of time, at a moment in time, or a combination thereof. For example, tradeable object bars 212, 222, and 232 represent a market for tradeable object 202; tradeable object bars 214, 224, and 234 represent a market for tradeable object 204; tradeable object bars 216, 226, and 236 represent a market for tradeable object 206. In some embodiments, different tradeable object bars may represent different points in time or over different periods of time. For example, tradeable object bar 212 may represent the market for tradeable object 202 during a first period of time and tradeable object bar 222 may represent the market for tradeable object 202 during a second period of time.

The tradeable objects represented on the relationship display 200 may be traded on the same exchange or different electronic exchanges. For example, the CL-HO-RB spread—which includes buying and/or selling tradeable objects 202, 204, 206—may be traded on the CME Globex platform. In another example, the relationship display 200 may display market data received from the CME Globex platform and ICE platform. One benefit of the relationship display 200 is that it may aggregate data from different exchanges, normalize the data, and allow the data to be displayed on the same display 200. This may save screen real estate and allow more intelligent decisions to be made more efficiently. Multiple displays are no longer needed to show relationships between tradeable objects—either on the same exchange or different exchanges.

Relationship Bar(s)

The relationship display 200 may include zero, one, two, or more relationship bars. For example, upon launching the relationship display, the relationship display 200 may include only relationship bar 210. In another example, the relationship display 200 may include more relationship bars than shown in FIG. 2. Additional relationship bars (e.g., 220, 230) may be added over time. For example, relationship bars may be continuously added to the relationship display after it is launched.

A relationship bar may be a graphical representation of an event or series of actions and events occurring over a period of time for one or more tradeable objects. The relationship bar may provide a graphical representation of a set of data over a period of time. The set of data may include data for one or more tradeable objects over that period of time. A relationship bar may include an interface that illustrates distribution, activity, or behaviors of multiple (e.g., two or more) tradeable objects relative to one or more of those tradeable objects. The relationship bar may illustrate distribution, activity, or behaviors of, for example, price, volume, or other attributes of the tradeable objects.

A relationship bar may be a graphical representation of a cluster, set, aggregation, or grouping of data relating to one or more tradeable objects. Accordingly, a relationship bar may be referred to as a cluster, set, aggregation, or group. For example, in some embodiments, the relationship bar may be referred to as a cluster of tradeable objects.

Figure 12:
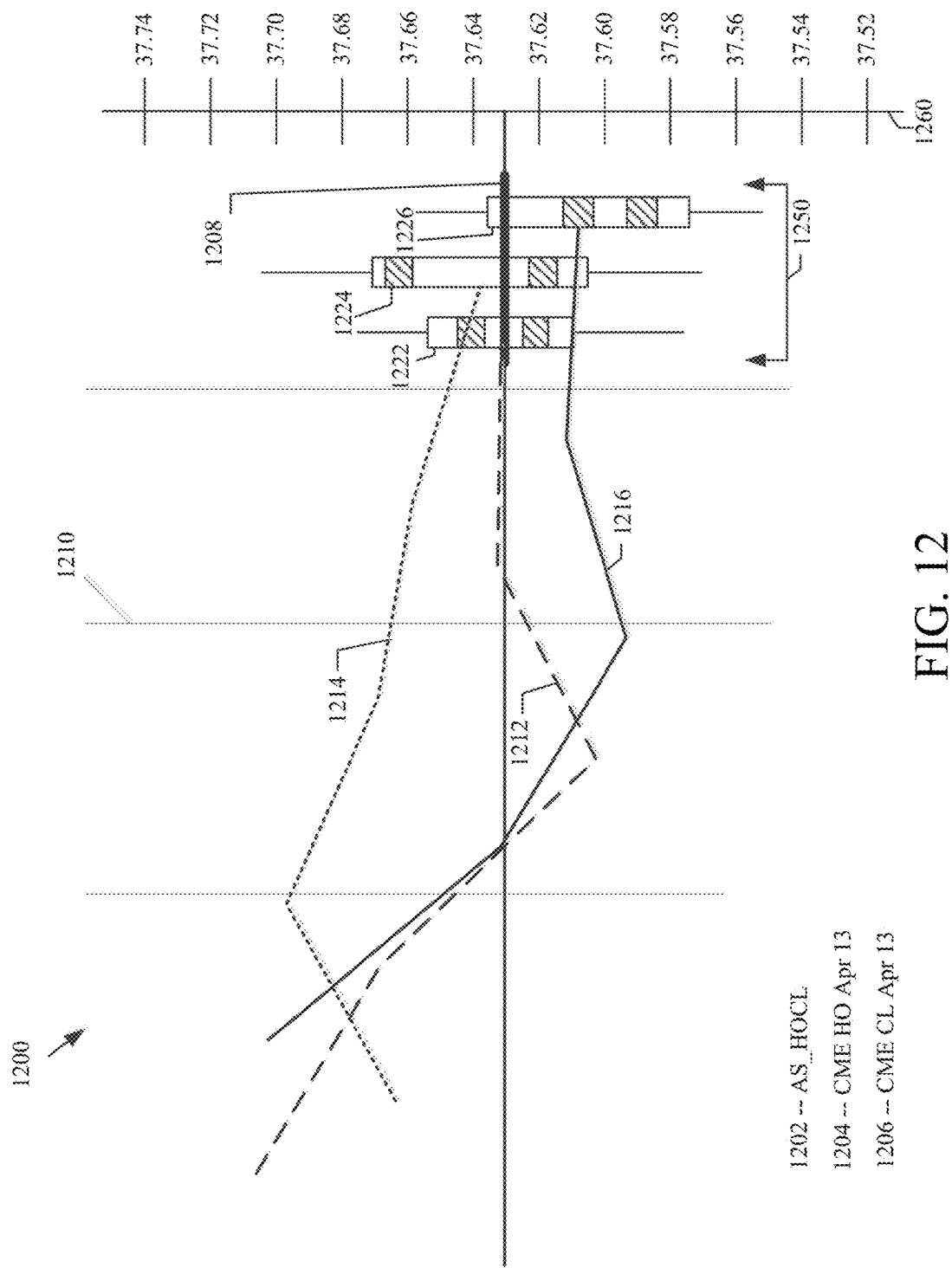
FIG. 12 illustrates a block diagram representative of a relationship display including both a line chart and a bar chart.

In some embodiments, the graphical representation may include a chart, diagram, graph, map, table, plot, log, combinations thereof or any other graphical or visual representation of data. Exemplary charts include bar charts, line charts, candlestick charts, area charts, open-high-low-close charts, Kagi charts, Sparkline charts, Gantt charts, bubble charts, timeline charts, pie charts, or some combination thereof. For example, FIG. 2 illustrates an exemplary bar chart and FIG. 12 illustrates a exemplary combination of a line chart and a bar chart.

A bar chart is a chart with rectangular bars with lengths indicating the values that they represent. The bars can be plotted vertically or horizontally. A candlestick chart is a graphical representation of price movements for a given period of time. Candlesticks may be formed by the opening, high, low, and closing prices of a tradeable object. If the opening price is above the closing price then a filled (normally red or black) candlestick is drawn. If the closing price is above the opening price, then normally a green or a hollow candlestick (white with black outline) is shown. The filled or hollow portion of the candle is known as the body or real body, and can be long, normal, or short depending on its proportion to the lines above or below it. The lines above and below, known as shadows, tails, or wicks represent the high and low price ranges within a specified time period. However, not all candlesticks have shadows.

A line chart or line graph is a type of chart which displays information as a series of data points connected by straight line segments. It is a basic type of chart common in many fields. It is created by connecting a series of points that represent individual measurements with line segments. A line chart is often used to visualize a trend in data over intervals of time—a time series—thus the line is often drawn chronologically. It is sometimes used to measure temperature.

An area chart or area graph displays graphically quantitive data. It is based on the line chart. The area between axis and line are commonly emphasized with colors, textures and hatchings. Commonly one compares with an area chart two or more quantities.

An open-high-low-close chart (also OHLC chart, or simply bar chart) is a type of chart typically used to illustrate changes or movements in the price of a tradeable object over time or any other sampling method that is available to trigger a "new" bar such as volume or other market data behavioral patterns. Each vertical line on the chart shows the price range (the highest and lowest prices) over one unit of time, e.g., one day or one hour. Tick marks project from each side of the line indicating the opening price (e.g., for a daily bar chart this would be the starting price for that day) on the left, and the closing price for that time period on the right. The bars may be shown in different hues depending on whether prices rose or fell in that period.

A timeline chart illustrates relative movement of the tradeable objects over time. A pie chart shows percentage values as a slice of a pie. A bubble chart is a two-dimensional scatterplot where a third variable is represented by the size of the points. A Kagi chart is a time-independent stock tracking chart that attempts to minimize noise. A sparkline is a very small line chart, typically drawn without axes or coordinates. It presents the general shape of the variation (typically over time) in some measurement, such as temperature or stock market price, in a simple and highly condensed way.

A relationship bar may include any number of tradeable object bars. The number of tradeable object bars may be defined or dynamic. For example, in some embodiments, the number of tradeable object bars in a relationship bar is fixed for that relationship display. However, in some embodiments, the number of tradeable objects in a relationship bar may be dependent on one or more future or prior relationship bars. The number of tradeable objects in a relationship bar may change (e.g., from 3 to 4 or from 4 to 3) based on prior or future market conditions. For example, when certain conditions (e.g., a range or volume of a currency exceed a trigger point) are satisfied, tradeable object bars may be added to or deleted from one or more of the relationship bars. By way of illustration, if tradeable objects 232 and 234 reach new highs, it may be beneficial to add another tradeable object (e.g., $4^{th}$ tradeable object) to one, some, or all of the relationship bars 210, 220, 230.

A relationship bar may represent relationship between tradeable objects during a period of time. For example, a relationship bar may provide a graphical representation of a spread (e.g., with multiple legs) during a period of time.

Relationship bars do not necessarily represent data over the same amount of time. For example, tradeable object bars 212, 214, and 216 may represent the tradeable objects during a first period of time. Tradeable object bars 222, 224, and 226 may represent the tradeable objects during a second period of time. Tradeable object bars 232, 234, and 236 may represent the tradeable objects during a third period of time. The first, second, and/or third time periods may be the same or different lengths of time.

As shown in FIG. 2, relationship bars 210, 220, 230 are displayed along a normalized relationship axis 240. The location or position of a relationship bar (e.g., relationship bar 220) is based on (e.g., dependent on, calculated from, derived from) the market data for that relationship bar (e.g., relationship bar 220) and the selected alignment bar (e.g., relationship bar 210).

In some embodiments, the horizontal and/or vertical location (e.g., relative to the normalized price axis) of the relationship bars 210, 220, 230 is based on attributes of the tradeable object bars and the normalized relationship axis. Alignment of the relationship bars moves each of the tradeable object bars in the alignment bar to a common alignment point. The tradeable object bars in the other relationship bars are then plotted as deltas from that alignment point.

Aspects of the relationship bars 210, 220, 230 may illustrate one or more tradeable object relationships. These aspects may include size, price, volume, location, bar indicators, and/or other attributes. Because the converted non-anchor object prices are based on the alignment price of the alignment bar, the tradeable object bars 212-216, 222-226, and 232-236 may change relative to each other without losing the relationship aspect of the tradeable objects. Converting non-anchor object prices based on the anchor price ties the non-anchor objects to the anchor object and thus the relationship is not lost.

Tradeable Object Bars

A tradeable object bar, such as tradeable object bars 212-216, 222-226, and 232-236, may represent one or more tradeable objects or trading strategies. For example, tradeable object bars 212, 222, and 232 represent tradeable object 202. Tradeable object bars 214, 224, and 234 represent tradeable object 204. Tradeable object bars 216, 226, and 236 represent tradeable object 206. However, in some embodiments, a tradeable object bar may represent multiple tradeable objects. For example, a tradeable object bar may represent a trading strategy comprising multiple tradeable objects (e.g., synthetic spread with "n" legs). As a result, the relationship display may be used to illustrate relationships between different trading strategies.

A tradeable object bar may be a visual representation of one or more aspects of the tradeable object or trading strategy. For example, a tradeable object bar may represent price aspects of a tradeable object for a particular period of time. Exemplary price aspects that may be represented include the high price, low price, average high price, average low price, average midpoint, average ask, average bid, VWAP, or other price aspects of the tradeable object.

A tradeable object bar may be displayed relative to a normalized relationship axis. In some embodiments, certain aspects of one or more tradeable objects may be converted such that all of the tradeable object bars may be displayed relative to the same relationship axis. For example, in some embodiments, price aspects of tradeable object bars may be normalized and charted relative to a normalized relationship axis.

A normalized relationship axis is an axis that includes one or more common attributes among the tradeable objects. In some embodiments, a common attribute may be a normalized price, such that the normalized relationship axis is a normalized price axis. The normalized price may be derived from the underlying price for the tradeable objects. Accordingly, the normalized price may not be the same as the underlying price(s).

Configuration

In some embodiments, a relationship display is configured. Configuring a relationship display may include, for example, selecting the tradeable objects to be displayed, selecting an anchor object, setting one or more multipliers, configuring one or more multiple market studies, selecting an alignment bar, or any combination thereof.

A relationship display may be configured prior to or after launching the relationship display. A user may configure the relationship display prior to initially launching the relationship display but then later update the configuration. For example, after launching the relationship display, a user may select a new alignment bar without exiting the relationship display. In another example, a user may turn on/off or even configure multiple market studies after initially launching the relationship display.

Figure 3:
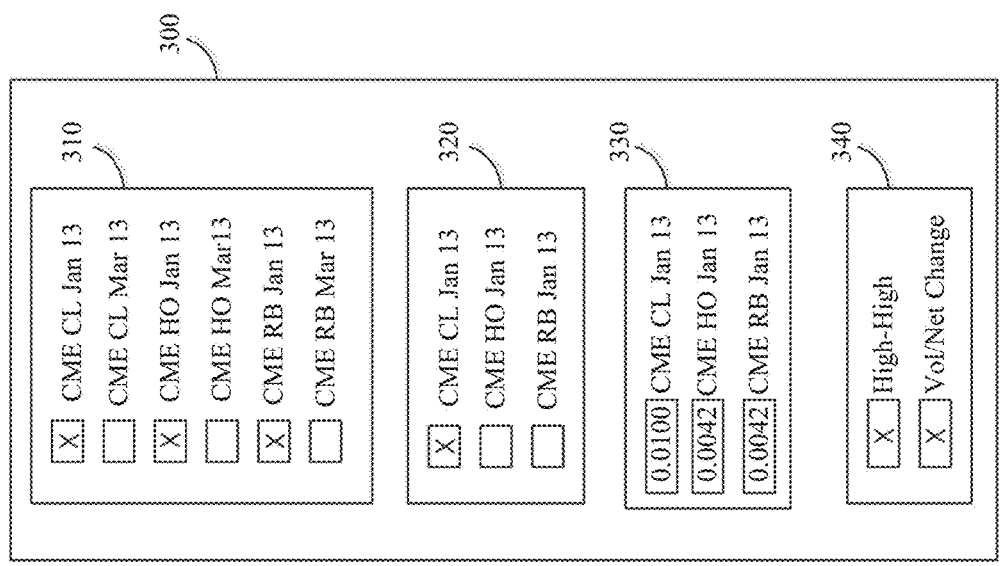
FIG. 3 illustrates a diagram representative of an exemplary configuration interface.

In some embodiments, configuring the relationship display may include using a configuration interface, such as the configuration interface 300 of FIG. 3. The configuration interface 300 includes a tradeable object selection interface 310, an anchor selection interface 320, a multiplier selection interface 330, and a study selection interface 340. The configuration interface 300 may include additional, different, or fewer components.

The tradeable objects to be displayed on the relationship display may be selected. Selection may include manual or automatic selection. For example, in some embodiments, a user may select the tradeable objects. FIG. 3 illustrates a configuration interface 300 that includes a tradeable object selection interface 310. The tradeable object selection interface 310 may be configured to allow the user to select one, two, or more tradeable objects to be displayed on a relationship display. The tradeable objects may be selected individually, as shown in FIG. 3, or as a predefined group of tradeable objects (e.g., the user selects a CL-HO-RB Jan 13 grouping). In the example of FIG. 3, the user may select the tradeable objects by clicking in the corresponding tradeable object or the corresponding box. An "X" indicates that the tradeable object was selected. In some embodiments, a tradeable object selection interface 310 may be used to configure one or more rules for adding or deleting tradeable object bars from a relationship bar. For example, if certain market conditions are met, then one or more tradeable object bars may be automatically (e.g., without additional user input) added or deleted from one, some, or all of the relationship bars.

An anchor object may be selected. The anchor object may be one of the selected tradeable objects. An anchor object may be a tradeable object that is used as a base. Non-anchor objects are those tradeable objects that were not selected as the anchor object. In some embodiments, the price aspects of non-anchor objects are converted to comparable units of the anchor object. For example, in some embodiments, a user may prefer viewing the relationship in terms of a certain unit, such as gallons, bushels, or barrels. As such, a user may select the tradeable object that uses that preferred unit as the anchor object. During operation, as will be discussed below, the price aspects of the other tradeable objects will be converted to this preferred unit.

Selection of an anchor object may be manual or automatic. For example, in some embodiments, a user may select a tradeable object to be used as the anchor object using the anchor selection interface 320 included in the configuration interface of FIG. 3. The anchor selection interface 320 may provide a list of the selected tradeable objects. The user may use the cursor to select the anchor object. A user may select the anchor object by clicking on the corresponding tradeable object or the corresponding box. An "X" indicates that the tradeable object was selected as the anchor object. In the example of FIG. 3, "CME CL Jan 13" is selected as the anchor object.

In some embodiments, an anchor object may be automatically selected. For example, the first tradeable object selected, for example, using the tradeable object selection window 310, may be automatically selected as the anchor object. In some embodiments, the anchor object may be manually selected. For example, as shown in the example of FIG. 3, the user may select the anchor object by clicking in the corresponding tradeable object or the corresponding box. An "X" indicates that the tradeable object was selected as the anchor object. In FIG. 3, CME CLE Jan 13 was selected using the anchor tradeable object selection interface 320, as the anchor object.

One or more multipliers may be set for each tradeable object. Multipliers may be used for converting. In some embodiments, as discussed more below, conversion may include price conversion, units conversion, or another desirable conversion. For example, while conversion from gallons to barrels may be logical in some situations, a user may see relevance to other conversions between seemingly unrelated objects and convert them by whatever multipliers they deem useful. In some embodiments, a multiplier selection interface 330 may be used to set one or more multipliers. For example, a user may manually input the multipliers for one or more of the tradeable objects. In some embodiments, the multipliers may be automatically defined, for example, as pre-defined numbers for a selected group of tradeable objects.

One or more multiple market studies may be configured. A multiple market study may include a study that is conducted over multiple tradeable objects during a particular period of time. The study selection interface 340 may be used to configure one or more multiple market studies. For example, the study selection interface 340 may be used to turn on/off (e.g., enable/disable) certain studies that relate to analytics of multiple markets. In some embodiments, a user may turn on/off a high-high study or volume/net change study, for example. Other studies may be controlled using the study selection interface 340.

An alignment bar may be selected. An alignment bar is a relationship bar that includes the alignment point (e.g., the high, low, midpoint, VWAP) upon which the other relationship bars are aligned. For example, the prices of the tradeable objects in the alignment bar may be aligned (e.g., converted to be the same) and the prices of the tradeable objects in the non-alignment bars will be calculated as deltas of that alignment point. As a result, the position or location of the relationship bars 210, 220, 230 is based on that alignment point. For example, if the midpoint price is selected as the alignment point of the alignment bar, the midpoint prices of the non-alignment bars will be converted (e.g., normalized) based on midpoint prices of the alignment bar.

Returning to FIG. 2, in some embodiments, the relationship display 200 includes an alignment indicator 208. The alignment indicator 208 may visually indicate which relationship bar is currently selected as the alignment bar. In the example of FIG. 2, the alignment indicator 208 is a bold line that extends through at least the tradeable object bars of relationship bar 210. Selecting a different relationship bar as the alignment bar may change the converted prices of the relationship bars and as a result change the alignment of the tradeable object bars. For example, if relationship bar 220 is selected as the alignment bar, the alignment indicator 208 may then extend through tradeable object bars 222-226.

Selection of an alignment bar may include, for example, clicking on a relationship bar displayed in a relationship display, dragging an alignment indicator to a different relationship bar, entering a corresponding relationship bar index number in a display toolbar, or otherwise selecting a relationship bar upon which to realign the display of the relationship bars.

Selection of an alignment bar may be automatic, manual, or a combination thereof. For example, when a relationship display is initially launched, the relationship bar that is initially displayed may be automatically selected as a default. In another example, a keyboard may be used to enter a relationship bar index number in a display interface (e.g., discussed more below). In yet another example, a user may use a cursor to drag an alignment bar indicator to a different relationship bar and thus selecting a new alignment bar. In yet another example, a computing device may automatically select a new alignment bar. For instance, a computing device may select a new alignment bar when one or more new relationship bars are generated, the current alignment bar moves off the screen, or upon some other criteria.

Normalization

In some embodiments, non-anchor objects are normalized. Normalizing the non-anchor objects may include converting aspects (e.g., price aspects, volume aspects) of the non-anchor objects based on one or more aspects of the anchor object. For example, in some embodiments, prices (e.g., midpoint prices, high prices, low prices, best ask prices, best bid prices) of the non-anchor objects are converted to a base unit of the anchor object. Normalization relates generally to adjusting values measured on different scales to a notionally common scale and/or adjusting the distribution of values into alignment, for example. Normalized data may be referred to as converted data, harmonized data, tailored data, or other data relating to the adjustment of values.

Figure 4B:
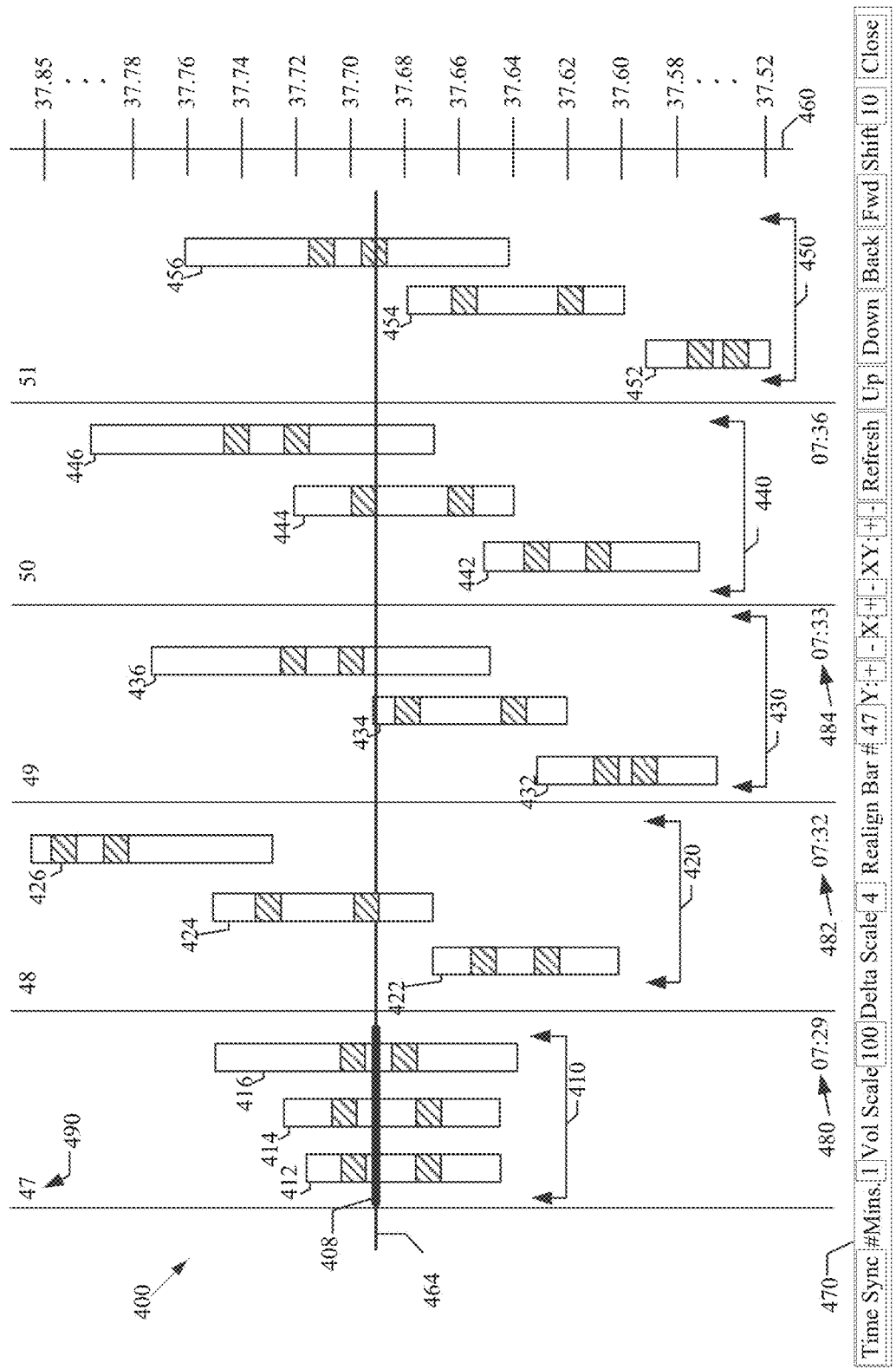
Figure 4D:
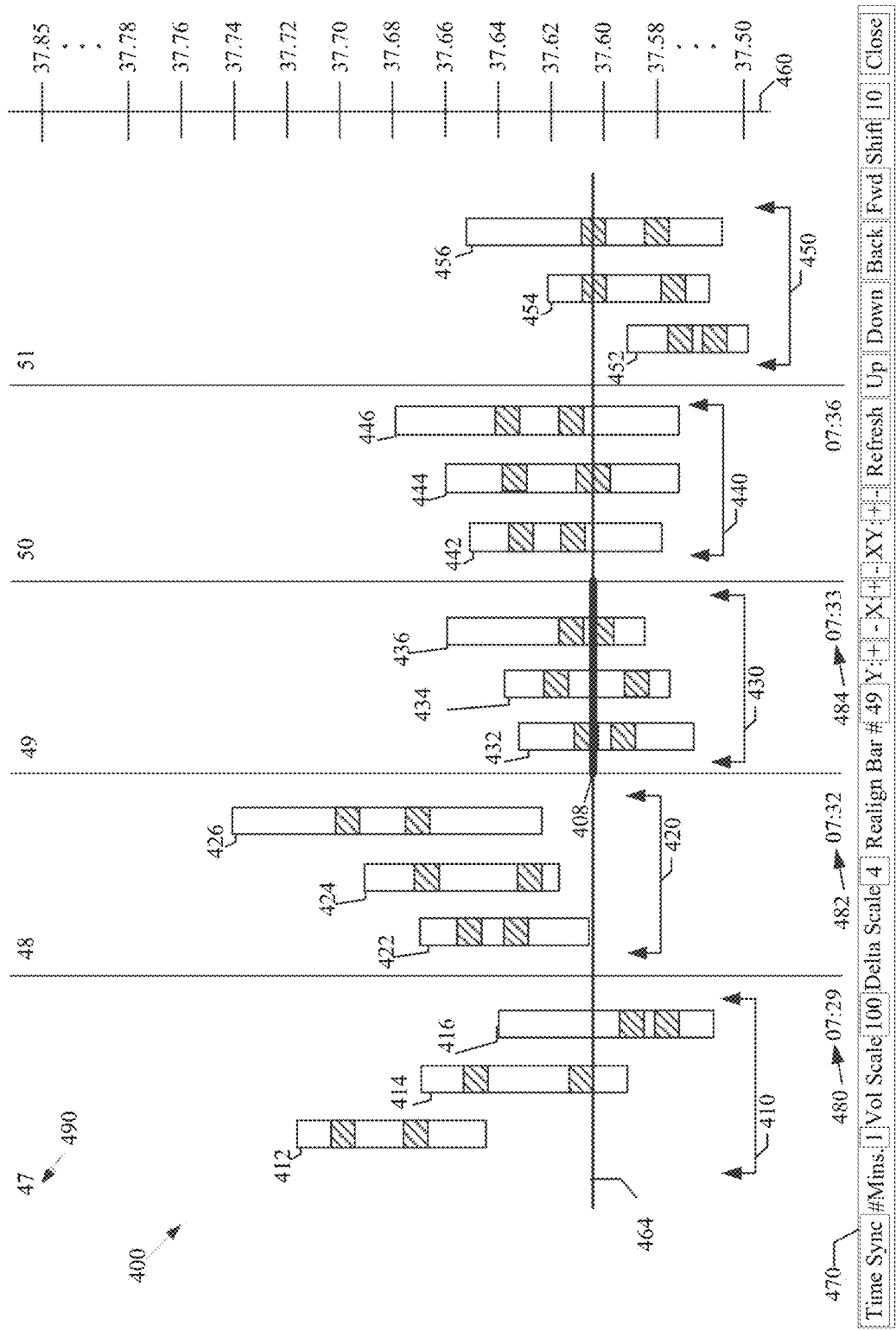
Figure 4F:
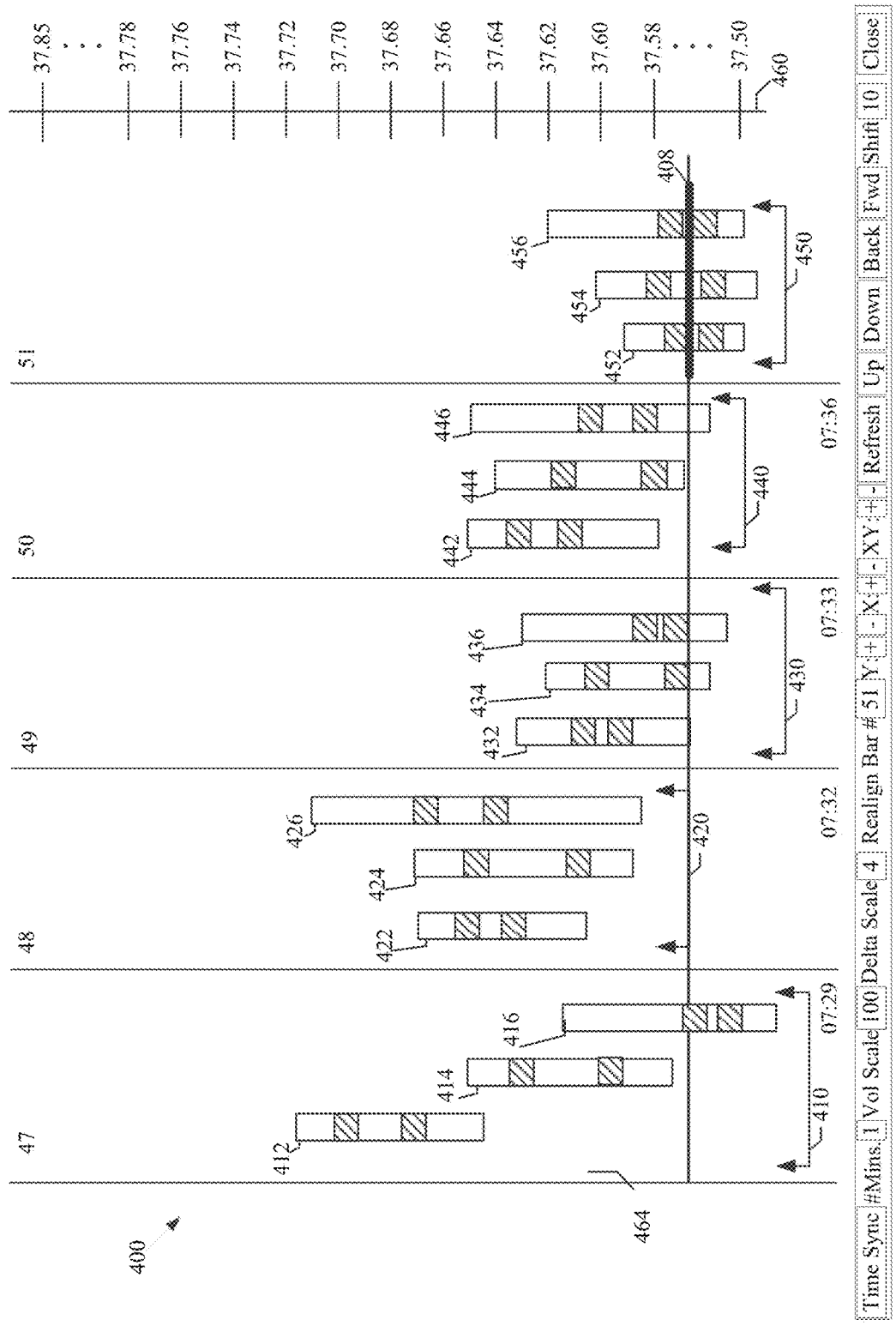

FIGS. 4A-4F illustrate an example of normalizing price aspects of non-anchor objects and charting these normalized price aspects. In particular, FIGS. 4A and 4B illustrate a scenario where relationship bar 410 is selected as the alignment bar. FIGS. 4C and 4D illustrate a scenario where relationship bar 430 is selected as the alignment bar. FIGS. 4E and 4F illustrate a scenario where relationship bar 450 is selected as the alignment bar.

In the scenarios of FIGS. 4A-4F, tradeable object 402 is AS_HOCL and has a multiplier of 0.01 which shifts the decimal to reflect an anchor object price ticking in 100ths. AS_HOCL is a synthetic tradeable object that is defined by the user. Tradeable object 404 is CME HO and has a multiplier of 0.0042. Tradeable object 406 is CME CL and has a multiplier of 0.01.

FIGS. 4A and 4B illustrate a scenario (Scenario 1) where relationship bar 410 is selected as the alignment bar.

FIG. 4A illustrates both raw and converted data underlying relationship bars 410, 420, 430, 440, 450. Raw data is data that is the same or similar to the data received from an electronic exchange. The raw data may include the actual data received from the electronic exchange. Converted data is raw data that has been normalized in accordance with an embodiment. In the scenario of FIGS. 4A and 4B, relationship bar 410 is selected as the alignment bar and tradeable object 402 is selected as the anchor object. Accordingly, the tradeable objects within the other relationship bars 420, 430, 440, 450 are aligned based on the selection of relationship bar 410 and, in particular, the alignment price of the anchor object.

Price data for the alignment bar may be determined. Determining the price data for the alignment bar may include calculating, receiving, retrieving, or otherwise identifying raw prices or converted prices for the tradeable objects included in the alignment bar. For example, in some embodiments, price data may include data including the best ask and/or best bid data for a tradeable object over a particular period of time. The average best ask and best bid may be calculated over that particular period of time. In another example, the best ask and/or best bid for a particular period of time may be determined using the data over this particular period of time. In yet another example, the last ask and/or last bid for this particular period of time may be determined from the market data for these particular tradeable objects.

FIG. 4A illustrates price data that may be determined for an alignment bar. In the example of FIG. 4A, relationship bar 410 is selected as the alignment bar, the midpoint price is selected as the alignment price, and tradeable object 402 is selected as the anchor object. As shown in FIG. 4A, price data may include data including the last ask ("Last"), last bid ("Bid"), high price ("High"), low price ("Low"), and last midpoint ("Mid"). The columns of "Raw" data is price data that has been received from an electronic exchange or calculated using the price data from the electronic exchange.

An anchor price may be determined. The anchor price may be the point of alignment. The point of alignment is the point that will be used to align the tradeable object bars. While FIGS. 4A-4F illustrate an example where the anchor price is the last midpoint price (e.g., the midpoint price immediately preceding the generation of relationship bar 420) of the anchor object, other prices may be used as the anchor price. For example, the anchor price may be a best bid, best ask, average bid, average ask, high price, average high price, low price, average low price, open (first) price for a particular period of time, close (last) price for a particular period of time, VWAP, or any price based element that is included in or can be derived from market data.

Determining the anchor price may include receiving the anchor price or calculating the anchor price, for example. For example, the anchor price may be received from an electronic exchange. In another example, the anchor price may be calculated. Using market data received from an electronic exchange, the last midpoint price may be calculated for the anchor object of the alignment bar. The last midpoint price is calculated, as shown in Equation 1, by subtracting the last bid price from the last ask price and dividing that by 2 and adding on the last bid price. In some embodiments, the result may be rounded to the nearest tradeable tick.

$$\text{last\_midpoint\_price} = (\text{last\_ask} - \text{last\_bid})/2 + \text{last\_bid} \qquad \text{Equation 1}$$

For example, as shown in FIG. 4A, the midpoint price for tradeable object 402, which is the anchor object, is 37.69 which was derived using the raw synthetic price of 3769 multiplied by the multiplier (0.01). The last midpoint price for tradeable object 404 is 31940. The midpoint price for tradeable object 406 is 9649. At this point, the units are still different for each tradeable object (e.g., $/barrel for object 402 and $/gallons for objects 404, 406). As such, these values are still considered raw values. They have not been converted to a base unit.

The non-anchor objects in the alignment bar may be normalized. Normalizing the non-anchor objects may include converting the price data of the non-anchor objects to the base unit of the anchor object. Conversion may be to units that are comparable to the anchor prices of the anchor objects or otherwise desirable to an end user. For example, while conversion from gallons to barrels may be logical, a user may see relevance to other conversions between seemingly unrelated objects and convert them by whatever multipliers they deem useful.

Normalizing the non-anchor objects of the alignment bar may include determining a normalization delta for the non-anchor objects based on the anchor price of the selected alignment bar and determining a normalized price for the non-anchor objects based on the normalization delta. Accordingly, the normalized price for the non-anchor objects is based on the anchor price. As such, alignment of the non-anchor objects is tied to the anchor price.

In some embodiments, a normalization delta is determined for the non-anchor objects. The normalization delta may be based on the anchor price of the selected alignment bar. For example, in some embodiments, as shown in Equation 2, the normalization delta for a non-anchor object may be calculated by subtracting the product of the midpoint price and multiplier of the anchor object from the product of the midpoint price and multiplier of the non-anchor object.

$$\text{normalization\_delta}(\text{non-anchor object 1}) = \text{midpoint\_price}(\text{non-anchor object 1}) * \text{multiplier}(\text{non-anchor object 1}) - \text{last\_midpoint\_price}(\text{anchor object}) * \text{multiplier}(\text{anchor object}) \qquad \text{Equation 2}$$

For example, as shown in FIG. 4A, the normalization delta for tradeable object 404 is 96.458 and the normalization delta for tradeable object 406 may be 58.8. Using Equation 2, these normalization deltas for the example of FIG. 2 may be calculated as follows:

$$\text{normalization\_delta}(404) = 96.458 = (31940*0.0042) - (3769*0.01)$$

$$\text{normalization\_delta}(206) = 58.8 = (9649*0.01) - (3769*0.01)$$

The normalization deltas may be used to determine normalized prices for the non-anchor objects. A normalized price may be calculated using any raw price for a non-anchor object, the non-anchor multiplier, and the normalization delta. For example, Equation 3 may be used to determine the normalized midpoint price for non-anchor objects.

$$\text{normalized\_price}(\text{object } n) = \text{raw\_object\_price}(\text{object } n) * \text{multiplier}(\text{object } n) - \text{normalization\_delta}(\text{object } n). \qquad \text{Equation 3}$$

Using Equation 3, these normalized prices for the non-anchor objects, which in this example are normalized midpoint prices, in the example of FIG. 4A may be calculated as follows:

$$\text{normalized\_midpoint\_price}(404) = 37.6900 = 31940*0.0042 - 96.458$$

$$\text{normalized\_midpoint\_price}(406) = 37.6900 = 9649*0.01 - 58.8$$

These normalized midpoint prices for tradeable objects 404 and 406 may then be displayed on the relationship display 200, as shown in FIG. 4B.

As shown in FIG. 4A and illustrated above, the normalized_midpoint_price (402), normalized_midpoint_price (404), and normalized_midpoint_price (406) are the same price. In particular, they are all 37.6900. This is the alignment point. As discussed in more detail below, the prices of the tradeable objects in the non-alignment bars are shown as deltas relative to this alignment point.

As shown in FIG. 4A, the high price, low price, last ask price, and last bid price for each of the non-anchor tradeable objects in the alignment bar may be converted using a similar process. In addition to the price data for the anchor object, these converted values may be used to graphically represent the tradeable objects, for example, as shown in FIG. 4B. Using converted price data for tradeable object 404 of FIG. 4A, the tradeable object bar 414, which represents tradeable object 404, may graphically represent that the converted high price is 37.73 (e.g., because the top of tradeable object bar 414 aligns with 37.73 on the normalized price axis), the converted last ask price is 37.71 (e.g., because the ask indicator of tradeable object bar 414 aligns with 37.71 on the normalized price axis), the converted midpoint price is 37.69 (e.g., because the midpoint of tradeable object bar 414 aligns with 37.73 on the normalized price axis), the converted last bid price is 37.67 (e.g., because the bid indicator of tradeable object bar 414 aligns with 37.67 on the normalized price axis), and the converted last low price is 37.65 (e.g., because the bottom of tradeable object bar 414 aligns with 37.65 on the normalized price axis).

A similar process may then be used for non-alignment relationship bars. Determining the price data for the non-alignment relationship bars may include receiving market data for the tradeable objects 402, 404, 406 for a different period of time (e.g., relative to the other relationship bars). For example, the raw data for relationship bar 420 may be different than the raw data for relationship bar 410 because they are collected or aggregated over different periods of time.

In some embodiments, there may be price fluctuations for the tradeable objects from relationship bar to relationship bar. For example, the high price for tradeable object bar 422 is 37.67, whereas the high price for tradeable object bar 412 (alignment bar) is 37.72. This represents a five (5) tick drop from relationship bar 410 to relationship bar 420. These changes or fluctuations, which are illustrated in the "Bar to Bar Tick Adjustments," is carried through the price data in relationship bar 420 for tradeable object 402. The bar to bar tick adjustments may be per tradeable object. For example, the last ask price, last midpoint price, last bid price, and the low price of tradeable object 402 all have a five (5) tick drop from relationship bar 410 to relationship bar 420. Similarly, tradeable object 404 in relationship bar 420 had a five (5) tick increase from relationship bar 410 and tradeable object 406 in relationship bar 420 had a ten (10) tick increase from relationship bar 410. Raw data movements in each tradeable object from relationship bar to relationship bar may be reflected in market data received the electronic exchange or derived from that data.

The price data for relationship bar 420 may be normalized. Similar to alignment bar, normalizing the non-anchor objects of relationship bar 420 may include determining a normalized price for the non-anchor objects based on the normalization delta, which was derived from the respective anchor price of the alignment bar. Accordingly, the normalized price for the non-anchor objects is based on the respective anchor price of the alignment bar. As such, alignment of the non-anchor objects of the non-alignment relationship bar 420 is tied to the anchor prices of the alignment bar.

For example, the converted last midpoint price of relationship bar 420 tradeable object 404 is 37.71. Using Equation 3, the normalized midpoint price for tradeable object 404 in relationship bar 420 may be calculated as follows:

normalized_price(object 404)=31945*0.0042−96.458

As shown in FIG. 4A, the remaining price data in relationship bar 420 may be normalized and plotted on the normalized price axis 460 of FIG. 4B. Likewise, the non-anchor object price data in relationship bar 430, 440, and 450 may be converted, for example, using a similar process as discussed above. The converted price data for relationship bars 430, 440, and 450 may be plotted on the normalized price axis 460 of FIG. 4B.

FIGS. 4C and 4D illustrate a scenario (Scenario 2) where relationship bar 430 is selected as the alignment bar. The non-anchor price data of the alignment bar (e.g., 430) and the non-alignment relationship bars (e.g., 410, 420, 440, 450) is normalized in a similar manner to that described above. However, in Scenario 2, the anchor price is the price data for the anchor object (e.g., AS_HOCL) of relationship bar 430, as opposed to price data for the anchor object (e.g., AS_HOCL) of relationship bar 410. The raw prices of relationship bar 430 have moved relative to relationship bar 420. For example, the anchor object has moved down four (4) ticks. Tradeable object 404 has moved down twelve (12) ticks. Tradeable object 406 have moved down eight (8) ticks. As a result of these movements, the normalization deltas for the non-anchor objects in Scenario 2 are different than the normalization deltas of Scenario 1. The normalization deltas for Scenario 2 are 96.52 (tradeable object 404) and 58.91 (tradeable object 406). The price data for the anchor objects and the converted price data for the non-anchor objects may be plotted on the normalized price axis 460 of FIG. 4D.

As shown in both FIGS. 4C and 4D, selecting a new relationship bar as the alignment bar (e.g., changing from relationship bar 410 in Scenario 1 to relationship bar 420 in Scenario 2) may change the display of the price data. For example, comparing FIG. 4B and FIG. 4D, the placement of tradeable object bars 432-436 in these different scenarios is different.

FIGS. 4E and 4F illustrate a scenario (Scenario 3) where relationship bar 450 is selected as the alignment bar. The non-anchor price data of the alignment bar (e.g., 450) and the non-alignment relationship bars (e.g., 410, 420, 430, 440) is normalized in a similar manner to that described above. However, in Scenario 3, the anchor price is the price data for the anchor object (e.g., AS_HOCL) of relationship bar 450, as opposed to price data for the anchor object (e.g., AS_HOCL) of relationship bars 410 and 430. The price movements for relationship bar 450 cause the normalization deltas to change, which causes a change in the converted price data for the non-anchor objects. The price data for the anchor object and the converted price data for the non-anchor objects may then be plotted on the normalized price axis 460 of FIG. 4F. One benefit of using the normalized price axis 460 is that the relationship between the anchor object and the non-anchor objects may be analyzed in different scenarios relative to a single price axis. The same price axis may be used to illustrate relative movement prior to and since the alignment point for all the tradeable objects. Both a first and second tradeable object may be displayed using the same price scales. Multiple charts for the tradeable objects are no longer needed. For example, no longer does a first tradeable object need to be displayed using a first set of prices and a second tradeable object need to be displayed using a second set of prices (e.g., where the first set of prices is different than the second set of prices). Furthermore, no longer does a first chart need to be overlayed onto a second chart and manually scaled in an attempt to show a relationship. Instead, each of the tradeable object bars are tied to the same anchor object which allows for an accurate and beneficial comparison of tradeable objects.

In some embodiments, a relationship bar may be aligned (e.g., positioned) based on both an alignment data set and a relationship data set. An alignment data set may include data relating to a selected alignment bar. A relationship data set may include data relating to a relationship bar. The alignment data set may be the same or different than the relationship data set underlying the relationship bar. For example, a first relationship bar represents tradeable objects A, B, C during a first period of time (e.g., 9:00 am-9:05:30 am). The first relationship bar may be selected as the alignment bar. Accordingly, the alignment data set may include market data for tradeable objects A, B, C for the first period of time. The alignment data set in this example is the same or similar to the relationship data set for first relationship bar. A second relationship bar represents tradeable objects A, B, C during a second period of time (e.g., 9:05:31 am-9:08 am), which covers a different, non-overlapping period of time than the first period of time. The relationship data set for the second relationship bar may include market data for tradeable objects A, B, C for the second period of time. In some embodiments, the display (e.g., location, size, position, angle) of the second relationship bar is based on both the alignment data set and the relationship data set. For example, the display of tradeable object bars representing the tradeable object bars in the second period of time are based on data for tradeable object bars A, B, C during the first period of time. Selecting a different alignment bar would change the dependency of tradeable object bars in the second period of time to the selected alignment bar.

As shown in FIGS. 4B, 4D, and 4F, in some embodiments, the relationship display 400 includes a forward/backward indicator 464. The forward/backward indicator 464 may include an indicator—such as a dotted or solid line—from the anchor price of the alignment bar to the normalized relationship axis. In some embodiments, the forward/backward indicator 464 may extend away from the normalized relationship axis, for example, toward historical relationship bars. For instance, if the relationship bar 430 is selected as the point of alignment, as shown in FIG. 4D, the anchor price indicator 464 may extend from relationship bar 430 to the normalization relationship axis 460 and/or from relationship bar 430 to (or through) the relationship bar 410 (e.g., opposite direction as the normalization relationship axis).

As shown in FIGS. 4B, 4D, 4F, the relationship display 400 may include index indicators ("index indicator") 490. Each relationship bar 410, 420, 430, 440, 450 may include a unique index indicator that may be used to reference the aggregated data for that relationship bar. A relationship bar is representing data for multiple tradeable objects over a period of time. This data may be indexed using the index indicators. In some embodiments, the index indicators may be sequential and continuous, such that the relationship bars may be indexed and referred to at a later time. For example, as shown in FIG. 4B, relationship bar 410 may be assigned an index indicator 490 of "47." Relationship bar 420 may be assigned an index indictor of 48 and so on for the other relationship bars. In FIG. 4B, selection of relationship bar 410 as the alignment bar is illustrated by the alignment indicator 408, which is the same or similar to alignment indicator 242 of FIG. 2.

The index indicators allow for selection of one or more relationship bars. For example, in some embodiments, a user may select a relationship bar as the alignment bar, for example, by clicking on a relationship bar. In some embodiments, an index indicator includes a numerical and/or alphabetical indicator (e.g., "12" or "a"), a graphical indicator (e.g., "&"), or a combination thereof (e.g., "2&12"). The selection may be used to align the relationship bars based on that relationship bar as the alignment bar. However, in some embodiments, as shown in FIG. 4B, a relationship toolbar 470 allows for alignment based on inputting the index indicator 490. The "Realign Bar #" allows the user to input the index indicator and then realign based on the corresponding relationship bar. For example, in FIG. 4B, the relationship bars are aligned based on relationship bar 410 because index indicator 47 is selected. In FIG. 4D, the relationship bars are aligned based on relationship bar 430 because index indicator "49" is selected. In FIG. F, the relationship bars are aligned based on relationship bar 450 because index indicator "51" is selected.

Selecting a different relationship bar as the alignment bar may include clicking on an interface representing the relationship bar, clicking on an index indicator, otherwise clicking something representing the relationship bar, entering the corresponding relationship bar index number 490 in a display toolbar 470, or otherwise selecting a relationship bar upon which to realign the display of the relationship bars. For example, entering a "49" into the "Realign Bar #" section of the display toolbar 470 may realign the chart using relationship bar 430 as the alignment bar.

In some embodiments, the length of time (e.g., amount data) represented by the index indicators may vary from index indicator to index indicator. While the index indicators may include a beginning time and end time, the length of time between the beginning time and end time may be determined by a non-time attribute. For example, as discussed below, the period of time associated with each index indicator may be determined based on attributes of the anchor object (e.g., traded volume or net change) and/or one or more of the non-anchor objects. Accordingly, the period of time associated with each index indicator may be different from index indicator to index indicator. For example, as shown in FIG. 4B, the amount of time associated with relationship bar 420 (e.g., index indicator 48) is 3 minutes. The beginning time 480 is 7:29 am and the end time 482 is 7:32 am of the same day. Whereas, the amount of time associated with relationship bar 430 (e.g., index indicator 49) is 1 minute. The beginning time 482 is 7:32 am and the end time 484 is 7:33 am of the same day.

The index indicator allows for analysis of a group of tradeable objects (e.g., in the relationship bar) during a length of time. This is valuable because it allows for analytics and display of data for those tradeable objects. It also allows for, as discussed more below, more detailed studies to be completed.

The data visualization of multiple markets in accordance with an embodiment allow for analysis of inconsistent behavior among and across sets of tradeable objects. The data visualization provides for a more granular review of the relationship between tradeable objects. Changes in the market for these tradeable objects may be compared side-by-side over a smaller period of time. Certain embodiments create analytic data sets or buckets of non-anchor tradeable objects' market data based on analytics associated with the anchor tradeable object or combination of analytics across any one or more of the objects described in some embodiments.

In some embodiments, each of the tradeable objects selected to be displayed on relationship display do not need to be based on each other. For example, there does not need to be an anchor object. Each of the tradeable objects may be adjusted to tick relative to a common axis. In other words, in some embodiments, the tradeable objects may be adjusted to have the same tick size without using an anchor object or anchor price.

ii. Multiple Normalized Relationship Axes

In some embodiments, a relationship display may include multiple (e.g., 2 or more) normalized relationship axes. The multiple normalized relationship axes may each be based on a different anchor object.

Figure 5A:
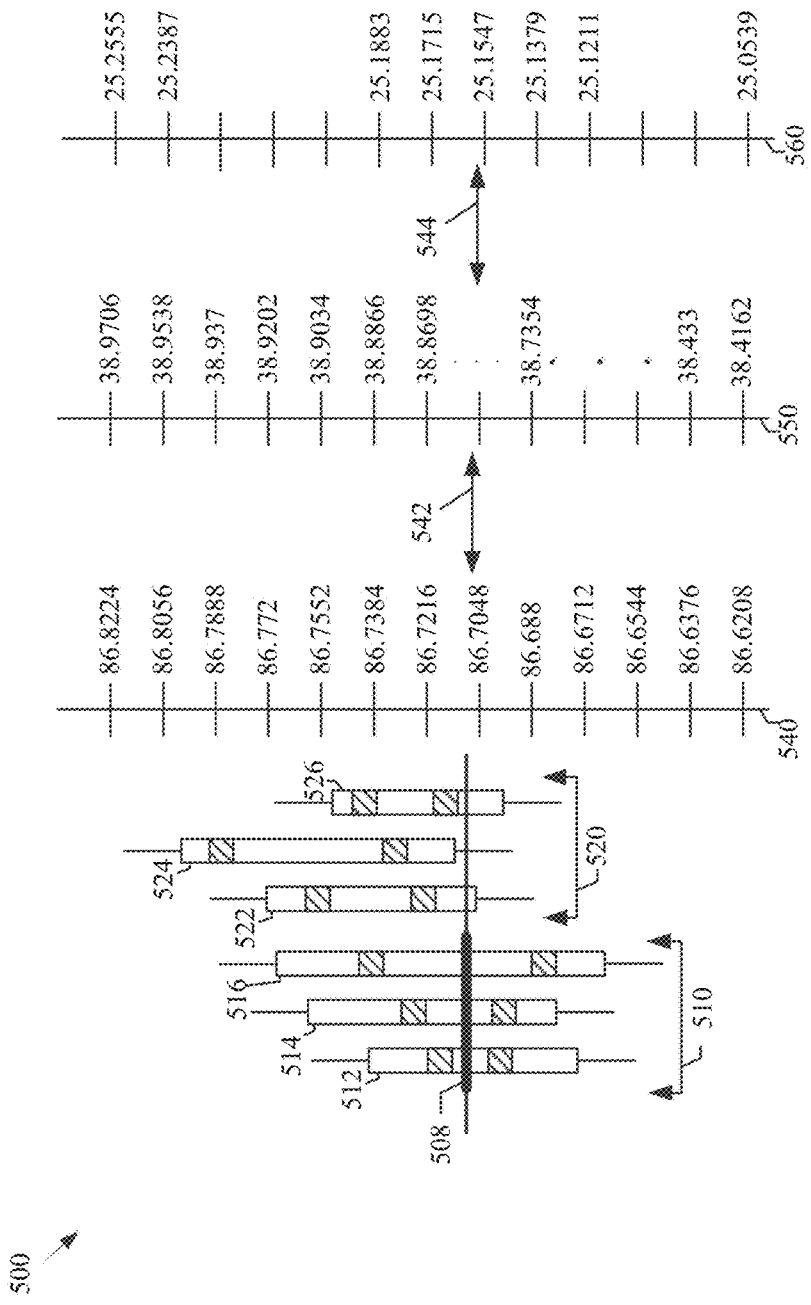
FIGS. 5A-5C illustrate block diagrams representative of shifting tradeable object bars without losing the logical connection between the tradeable object bars.

FIG. 5A illustrates a relationship display that includes multiple normalized relationship axes. As shown in FIG. 5, the relationship display 500 includes a first relationship bar 510 and a second relationship bar 520, which includes tradeable object bars 512-516 and 522-526, respectively. The relationship display 500 also includes normalized axes 540, 550, 560. Normalized price axis 540 displays the midpoint prices for tradeable object 502. Normalized price axis 550 displays the normalization deltas for tradeable object 504. Normalized price axis 560 displays the normalization deltas for tradeable object 506. In yet another embodiment, these secondary normalized price scales could in fact be the actual underlying prices of the tradeable objects linked explicitly to the corresponding normalized anchor price scale and then adjusted manually or automatically by formula as described below. Moreover any mathematical relationship among any two or more of the tradeable objects could also be plotted and used, such as the net difference between 504 and 506 as both rise in price but one rises faster or more slowly during any given observation.

In some embodiments, the price scale of the normalized price axes 550 and 560 may be shown as changes in the normalization deltas, net change, non-normalized prices, or other price aspects. However, in some embodiments, the selected price aspects across the normalized price axes should be linked together such that shifting tradeable object bars will be reflected on the price scales.

The non-anchor tradeable object bars may be shifted individually or as a group. The non-anchor tradeable object bars may be shifted up or down relative to the tradeable object bars that are not shifted (e.g., anchor tradeable object bars or other non-shifted tradeable object bars).

Figure 5B:
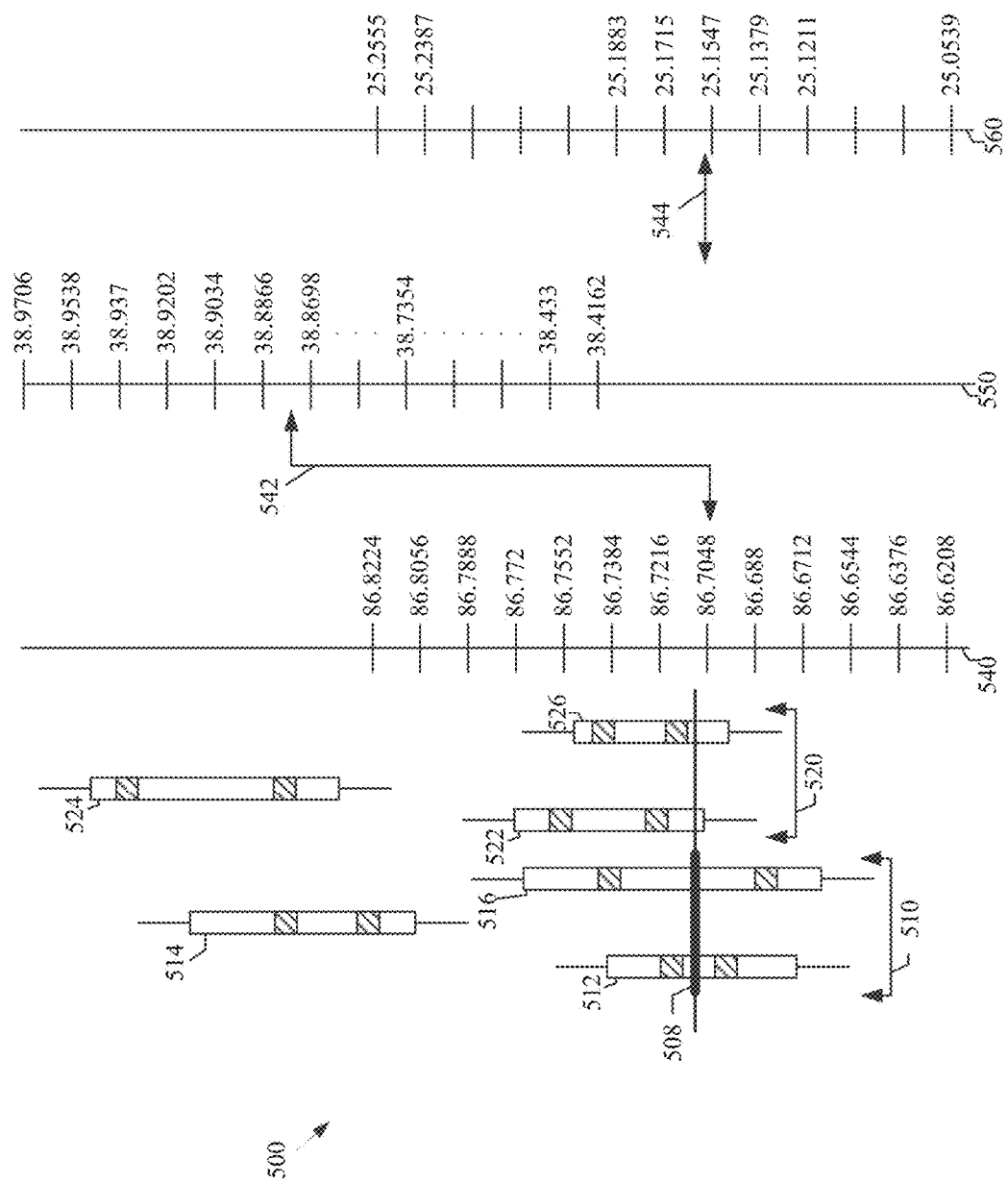

The shift indicators 542, 544 indicate shifts of the tradeable objects. FIG. 5A illustrates that there have not been shifts of tradeable object bars 512-516, 522-526. However, in some embodiments, as shown in FIG. 5B, non-anchor tradeable object bars may be individually shifted. In other words, the tradeable object bars representing tradeable object 504 may be shifted independent of the tradeable object bars representing tradeable object 506. In FIG. 5B, tradeable object bars 514, 524—which represent tradeable object 504—may be shifted up (e.g., relative to the other tradeable object bars 512, 516, 522, 526). The shift indicator 542, which connects the normalized relationship axes 540, 550, indicates that the tradeable object bars 514, 524 were shifted up and by how much they were shifted.

In some embodiments, shifting tradeable objects includes selecting (e.g., clicking) the point where the tradeable objects are to be shifted. For example, in FIG. 5B, a user may select the adjusted location by normalization by clicking on the normalized relationship axis 550 at the desired display location. For example, upon a left click of a mouse, the entire axis 550 will shift and re-align the prices along axis 550 so that the original non-adjusted price of 38.7432 is proportionally relocated to the display location (i.e. X,Y coordinate) selected by the user's left click. Then, if the user wants to realign the tradeable objects (e.g., remove the shift), back to the original X, Y coordinate on the display, the user may right click on the normalized relationship axis 550. The tradeable object bars would then realign as shown in FIG. 5A (e.g., assuming that the market is the same).

In some embodiments, whatever price is being pointed to before any adjustment is the price that it should be pointing to after adjustment. The shift causes the entire price column to shift and relocate the alignment price 38.7432 (because the example shows the price scale for the non-anchor legs as deltas, could also be net change, or non-normalized prices as we normally use today) to the exact locating chosen by the mouse click to the exact Y Axis coordinate.

As shown in FIG. 5B, the normalized relationship axis 550 may shift with the tradeable object bars 514, 524. In other words, the normalization deltas continue to correspond to the relationship axis 550.

Figure 5C:
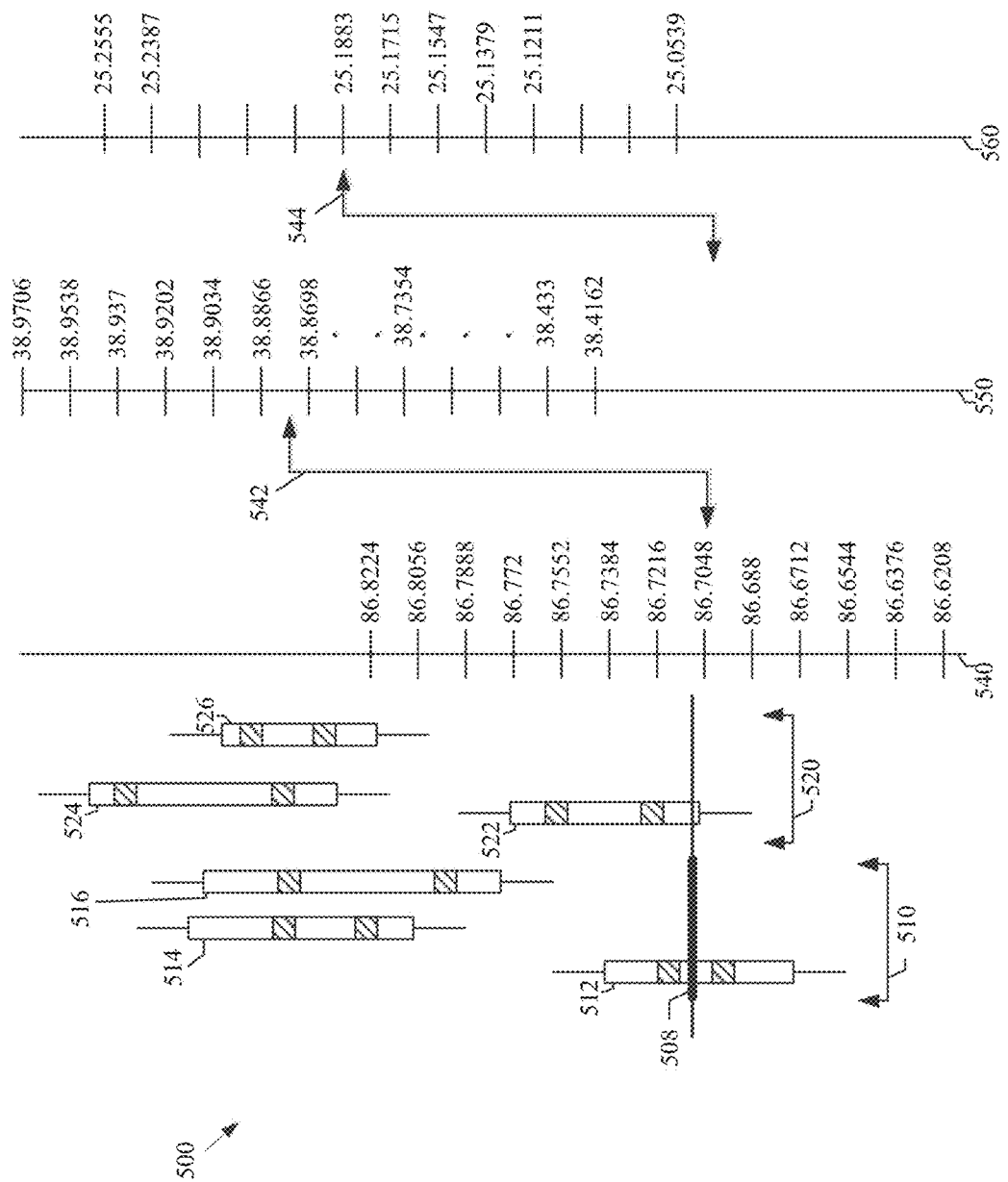

FIG. 5C illustrates an embodiment where the tradeable object bars are shifted as a group. In other words, the tradeable object bars representing both tradeable object 504 and 506 shift together, such that the spacing representing the pricing relationship between tradeable object bars (e.g., 514, 516) remains consistent.

Shifting tradeable object bars may be beneficial in certain scenarios. In some embodiments, the spacing between tradeable object bars may be large (e.g., where a user would need to zoom out to an undesired granularity in order to view the tradeable object bars on the relationship display). Instead of zooming out, the tradeable object bars may be shifted, such that they are within view of each other. However, because the shift does not change the normalization (e.g., the logic remains the same), the shift is indicated on the normalized price axes and the visual and numerical pricing relationships between the shifted objects remains the same.

iii. Triggering a New Relationship Bar

Figure 6A:
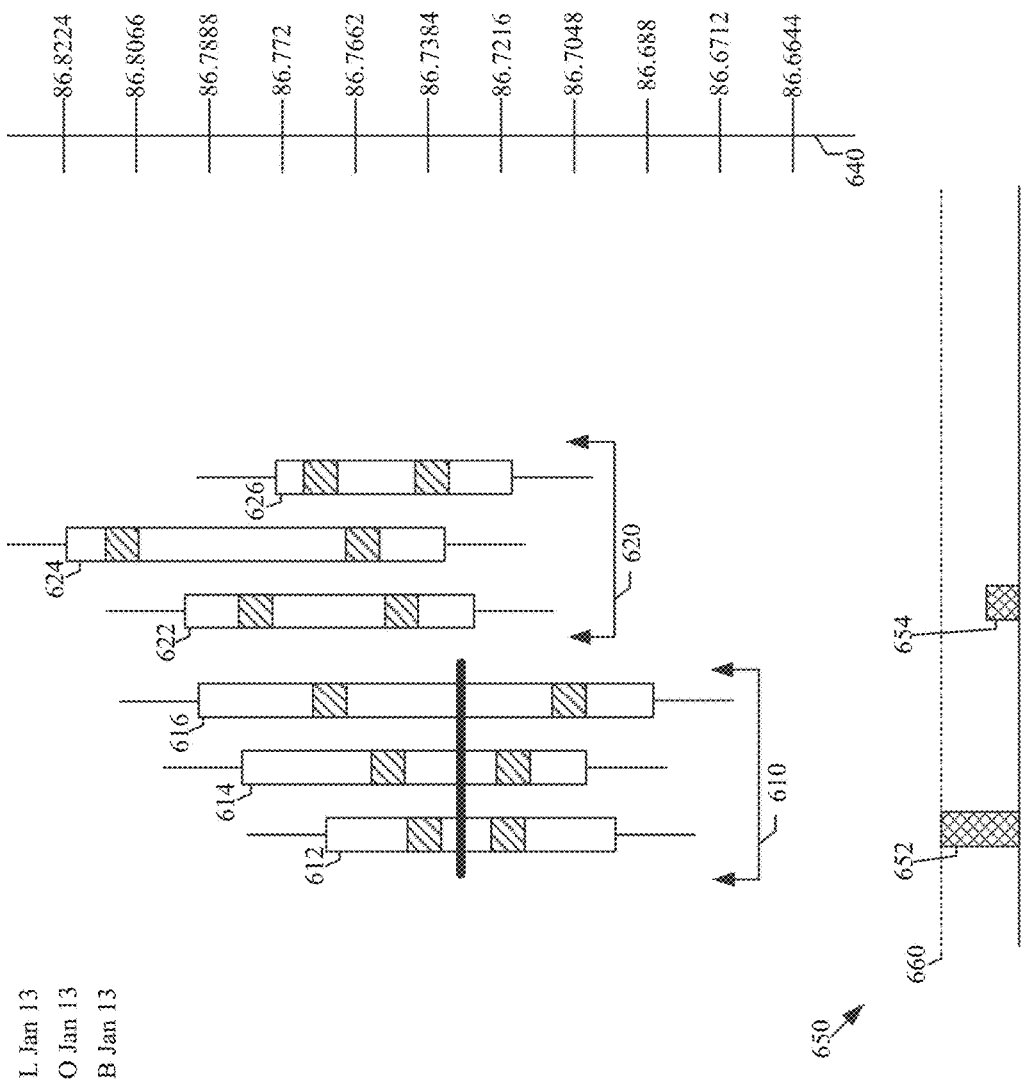
FIGS. 6A-6C illustrate block diagrams representative of generating a new relationship bar.
Figure 6B:
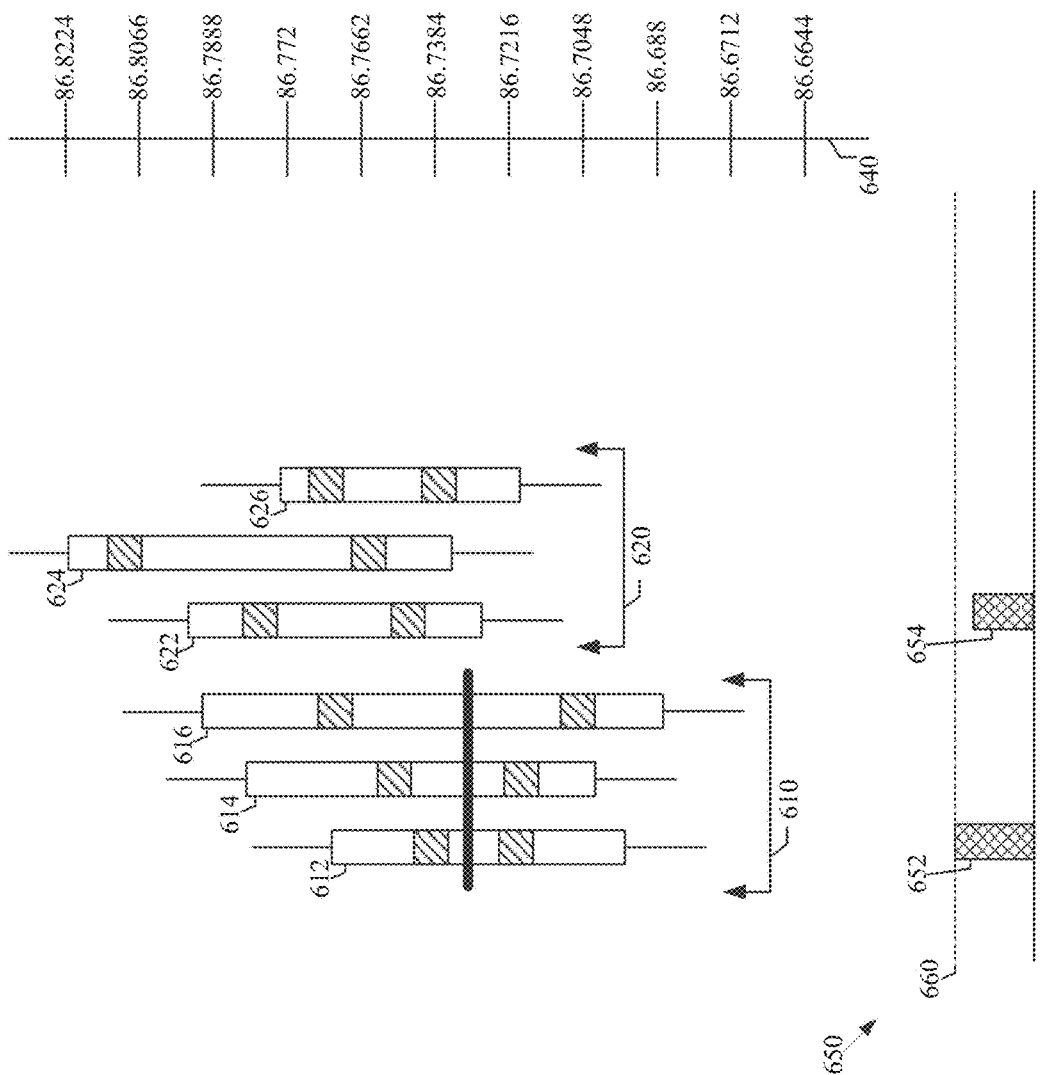
Figure 6C:
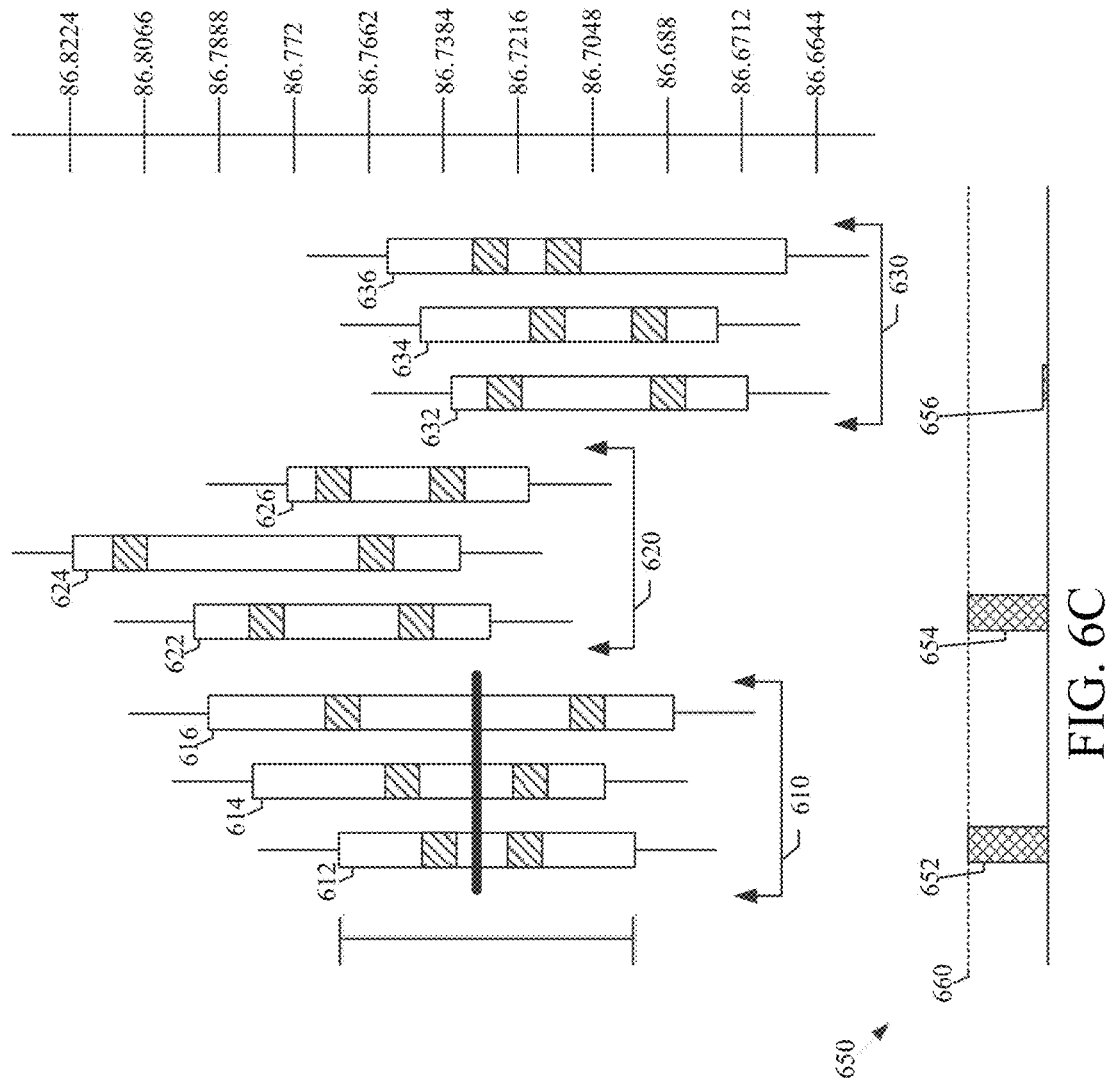

In some embodiments, a new relationship bar is generated when a defined period of time (e.g., 1 second, 5 minutes) ends. However, in other embodiments, a new relationship bar is generated based on attributes of the anchor object. For instance, in some embodiments, a new relationship bar may be generated when the volume for the anchor meets a certain volume traded threshold or any attribute within any single or comparatively among the tradeable objects by formula or other criteria becomes true For example, as shown in FIGS. 6A-6C, the relationship display 600 includes relationship bars 610 and 620 which include tradeable object bars 612-616 and 622-626. Tradeable object bars 612, 622, 632 represent tradable object 602. Tradeable object bars 614, 624, 634 represent tradable object 604. Tradeable object bars 616, 626, 636 represent tradable object 606.

The relationship display 600 includes a trigger display 650. The trigger display 650 may illustrate progress or status of when a new relationship bar will be generated (e.g., triggered). In some embodiments, triggering a new relationship bar includes setting a non-time based trigger level, checking whether the trigger level is satisfied, and generating a new relationship bar when the trigger level is satisfied. Non-time based trigger levels may include using a non-time based attribute, such as volume traded, net change, or other attributes of a tradeable object.

The trigger display 650 includes trigger indicators 652, 654, 656 which indicate the progress of the non-time based attribute relative to a trigger level 660. When the trigger indicators reach or satisfy the trigger level 660, a new relationship bar is generated.

FIGS. 6A-6C illustrate an example of using a trigger level that is based on the volume traded for the anchor object, which in this example is tradeable object 602. Accordingly, the trigger display 650 may be a volume traded display. As shown in FIG. 6A, relationship bar 610 was generated, for example, when the relationship display 600 was initially launched.

The volume traded display 650 includes a volume traded indicator 652. In this example, it is a bar representing volume traded for tradeable object 602. In FIG. 6A, as tradeable object 602 is traded, the volume traded indicator increases in height. In some embodiments, other indicators are used to represent the volume traded.

The volume traded display 650 includes a trigger indicator 660. The trigger indicator 660 visually illustrates the amount of traded volume relative to when a new relationship bar will be triggered. For example, when the volume traded indicator 652 reached the trigger indicator 660, relationship bar 620 was generated and displayed on the relationship display 600. Similarly, because the volume traded indicator 654 has not reached the trigger indicator 660, a new relationship bar has not been generated. As shown in FIG. 6B, the volume traded indicator 654 has increased, relative to that shown in FIG. 6A, but still has not reached the trigger indicator 660. However, as shown in FIG. 6C, the volume traded indicator 654 reached (e.g., satisfied) the trigger indicator 660, so relationship bar 630 was generated and includes tradeable object bars 632, 634, 636. Volume traded indicator 656 is now tracking the amount of volume traded for the anchor object.

In some embodiments, a volume traded display may include indicators representing the volume traded for an anchor object or both anchor objects and non-anchor objects. For example, as shown in FIGS. 6A-6C, the volume traded display 650 included only an indicator (652, 654, 656) representing the volume traded for the anchor object. However, as shown in FIG. 7, a volume traded display 700 may include both indicators representing the volume traded for anchor objects and non-anchor objects. The volume traded indicator 710 represents the volume traded for the anchor object 702. The volume traded indicator 720 represents the volume traded for the non-anchor object 704. The volume traded indicator 730 represents the volume traded for the non-anchor object 706.

In some embodiments, one or more trigger objects may be selected. As a result, attributes of the tradeable objects being represented by the trigger objects may trigger a new relationship bar. In some embodiments, the same trigger indicator (e.g., same volume level) may be used for each of the tradeable objects. However, in other embodiments, different trigger indicators may be used for the various tradeable objects. For example, as shown in FIG. 8, the trigger indicator 810 for tradable object 802 may be at a different volume level than one or both of the trigger indicators 820, 830 for tradeable objects 804, 806. The first tradeable object to reach the respective traded volume will trigger a new relationship bar.

In some embodiments, in addition to non-time based attributes, trigger levels may be based on time. For example, a non-time based trigger level may be used, however, if it is not satisfied in 5 minutes, then a new relationship bar is generated. In another example, a trigger level may be formulaic. Formulaic triggers may include non-time based attributes, time based attributes, or any combination thereof. This may help identify a desired distribution of market data on the relationship display. For example, an algorithm may be set to dynamically change the trigger level. One, some, or all of the trigger levels of a relationship bar may change, for example, prior to a trigger level being satisfied (e.g., during the middle of a relationship bar) or at the end of a relationship bar (e.g., from relationship bar to relationship bar).

Figure 9:
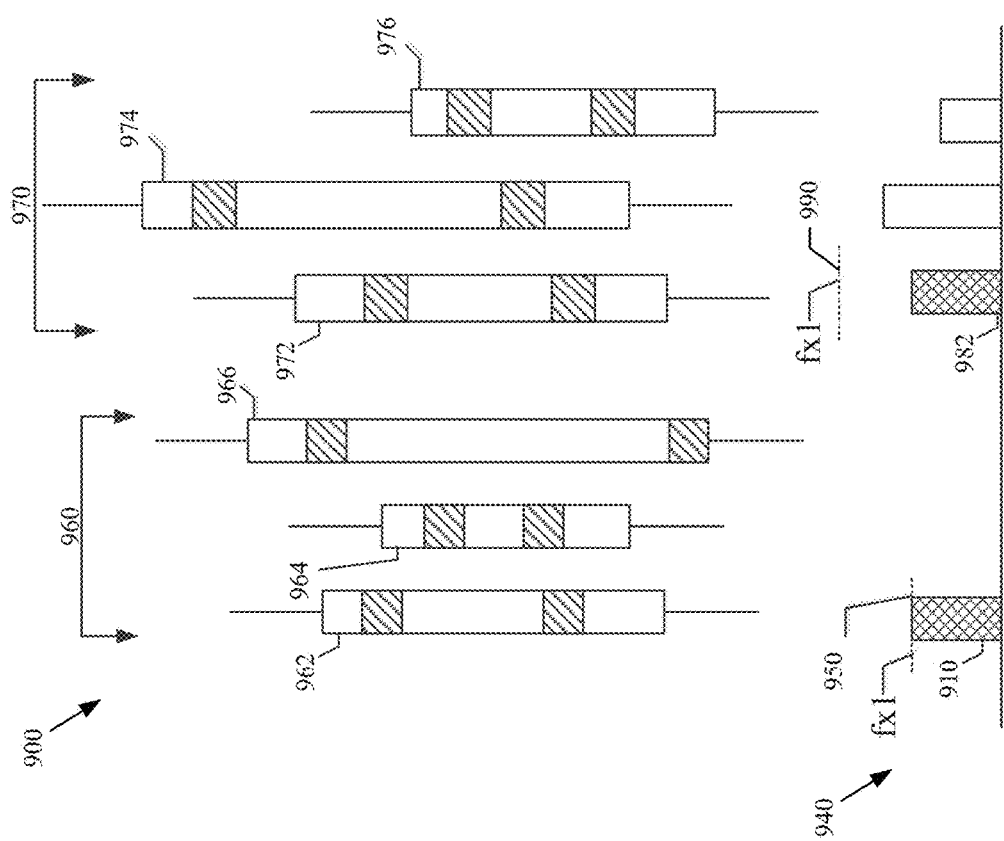
FIG. 9 illustrates a block diagram representative of generating a new relationship bar.

By way of illustration, as shown in FIG. 9, a trigger level 950 may be based on an algorithm that uses both net change of tradeable object 962 and time. The trigger level 950 is based on net change of tradeable object 962. Once the tradeable object that is represented by tradeable object bar 962 satisfies the net change level 950, a new relationship bar is generated. However, if the trigger level 950 is satisfied in less than 10 seconds, then the trigger level for the next relationship bar increases 25% and if the trigger level 950 takes longer than 30 seconds, then the trigger level for the next relationship bar decreases 25%. Otherwise (e.g., net change level 950 is satisfied in the range of 10-30 seconds), the net change level remains the same. In the example of FIG. 9, at the end of relationship bar 960 (e.g., when trigger indicator 910 reaches the trigger level 950), the amount of time to satisfy trigger level 950 is determined. Accordingly, the new trigger level 990, associated with new relationship bar 970 (including tradeable object bars 972-976), is set based on this amount of time. In the example of FIG. 9, the trigger level 950 was satisfied in less than 10 seconds, so the new trigger level 990 was increased 25%. Trigger indicator 982 must now reach trigger level 990 before a new relationship bar is generated. Other algorithms may be used to help set the trigger level at the appropriate level.

In some embodiments, there may be multiple trigger levels for a single tradeable object. For example, the anchor object may include both a volume traded trigger and a net change trigger. Satisfaction of one, some, or all of the multiple trigger levels may generate a new relationship bar.

In some embodiments, trigger levels may be based solely on time. For example, in some embodiments, a new relationship bar may be generated every minute during trading hours and every hour during non-trading hours. In another example, each relationship bar may be associated with the same amount of time.

The tradeable object bar may include a visual representation of a tradeable object. Color, shading, or other visual representations may be used to show the association. For example, a label for a tradeable object (e.g., "CME CL Jan 13") and the corresponding tradeable object bar may include the same coloring.

Figure 10:
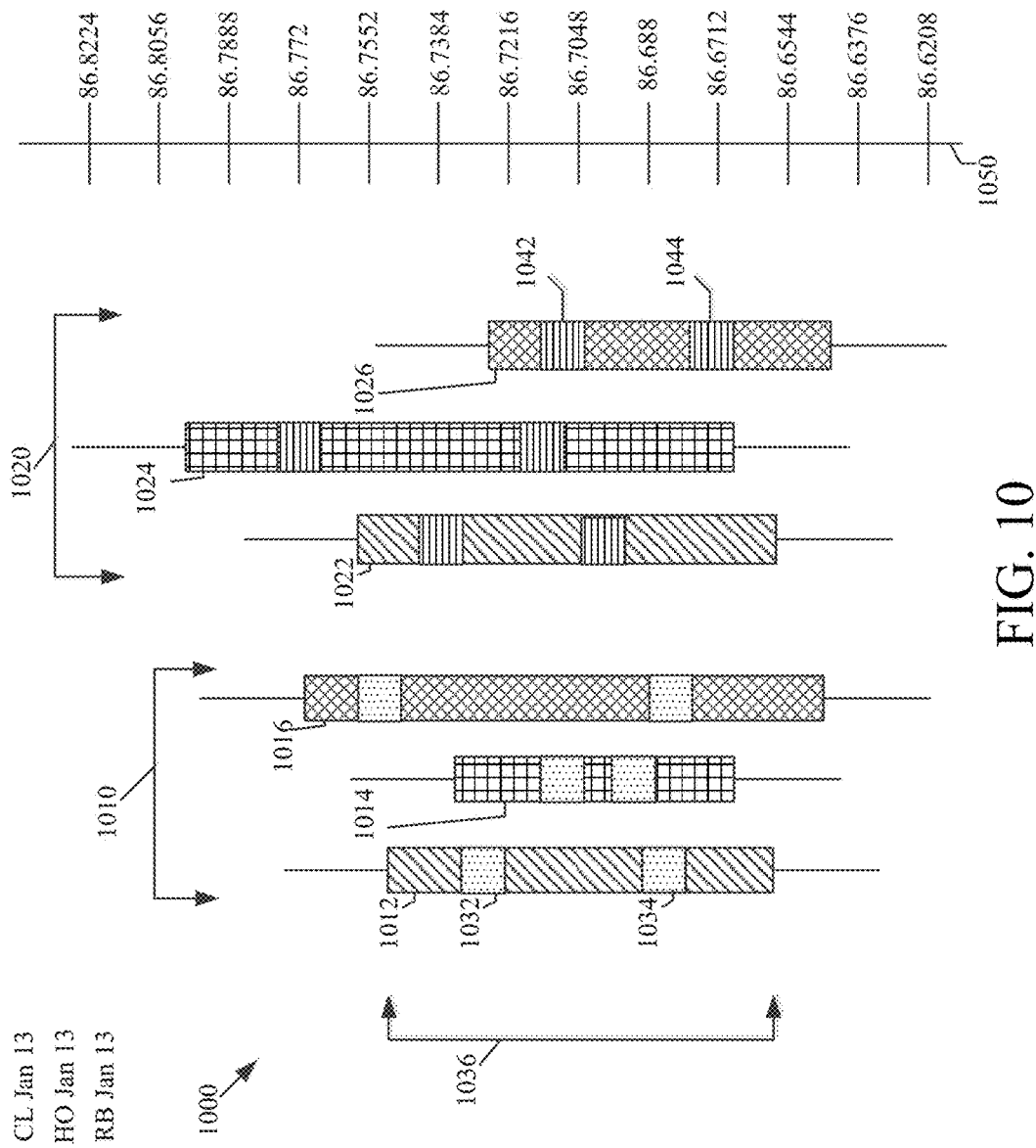
FIG. 10 illustrates a block diagram representative of tradeable object bars including different display characteristics.

FIG. 10 illustrates an exemplary relationship display 1000 where coloring, shading, or other visual representations are used to show association. The relationship display 1000 includes relationship bars 1010, 1020 that include tradeable object bars 1012-1016 and 1012-1026. Tradeable object bars 1012, 1022 represent tradeable object 1002, which in this example is CME CL Jan 13. Tradeable object bars 1014, 1024 represent tradeable object 1004, which in this example is CME HO Jan 13. Tradeable object bars 1016, 1026 represent tradeable object 1006, which in this example is CME RB Jan 13. The relationship bars 1010, 1020 may be displayed relative to a normalized relationship axis 1050.

In some embodiments, as shown in FIG. 10, the color, shading, or other visual aspects of the tradeable object bars are the same or different. The color, shading, or other visual aspects may be the same if representing the same tradeable objects. For example, as shown in FIG. 10, the color of tradeable object bars 1012, 1022 may be the same (e.g., green) but different than the color (e.g., blue) for the tradeable object bars 1014, 1024 representing tradeable object 1004 and/or the color (e.g., red) for the tradeable object bars 1016, 1026 representing tradeable object 1006.

In some embodiments, the tradeable object bars may include market indicators. Market indicators may indicate conditions about a particular market. For example, market indicators may indicate the inside market, open/close price, high price, low price, or other market conditions including but not limited to various states of any combination of triggers that could create new relationship bars. The conditions about the particular market may be at any point in time after generation of the relationship bar and prior to generating a new relationship bar. For example, the market indicators may indicate the opening price. In another example, the market indicators may indicate the average over the time period. In another example, the market indicators may indicate the closing price. In the example of FIG. 10, the market indicators 1032-1034, 1042-1044 represent the inside market of a particular market. For example, market indicators 1032, 1042 represent the best ask and market indicators 1034, 1044 represent the best bid for their given markets.

In some embodiments, the market indicators are historical indicators. For example, they are no longer being updated. The market indicators are representing data in a relationship bar that is no longer changing or being updated with new market data (e.g., the trigger level was satisfied and new relationship bars have been generated). For example, as shown in FIG. 10, the market indicators 1032, 1034 could represent the average or last best bid and best ask prices for tradeable object 1002 during the relationship bar. In some embodiments, the height of the tradeable objects shows the range of the best bids and best asks for the relationship bar. For example, as shown in FIG. 10, the height 1036 of tradeable object bar 1012 represents that the best ask during the time period of relationship bar 1010 reached 86.7388 and the best bid during the time period of relationship bar 1010 reached 86.6712.

In some embodiments, the market indicators are current indicators. Current market indicators are still changing. They reflect changes in the market as market data is received. As shown in FIG. 10, the market indicators 1042, 1044 show the current best ask and best bid prices for tradeable object 1006. In some embodiments, there may be a graphical distinction between historical market indicators and current market indicators. For example, as illustrated in FIG. 10, in addition to the difference in color of the tradeable object bars 1012, 1026, the historical market indicators 1032, 1034 have a different color than the current market indicators 1042, 1044. In the event that there was additional relationship bars, the historical market indicators may have the same color. In some embodiments, all of the market indicators have the same color, for example.

Figure 11A:
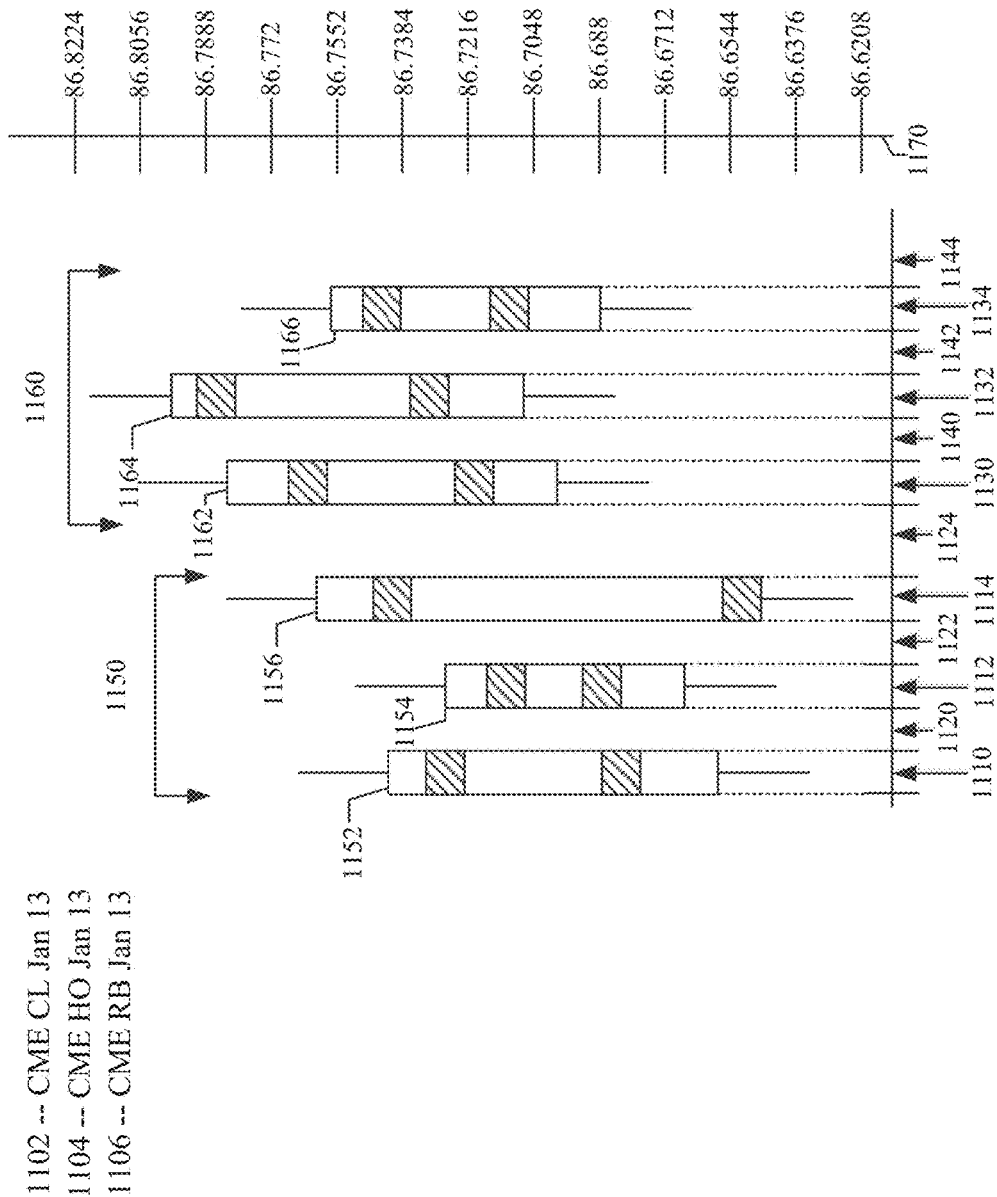
FIGS. 11A-11B illustrate block diagrams of spacing the tradeable object bars and selecting/deselecting the tradeable object bars.
Figure 11B:
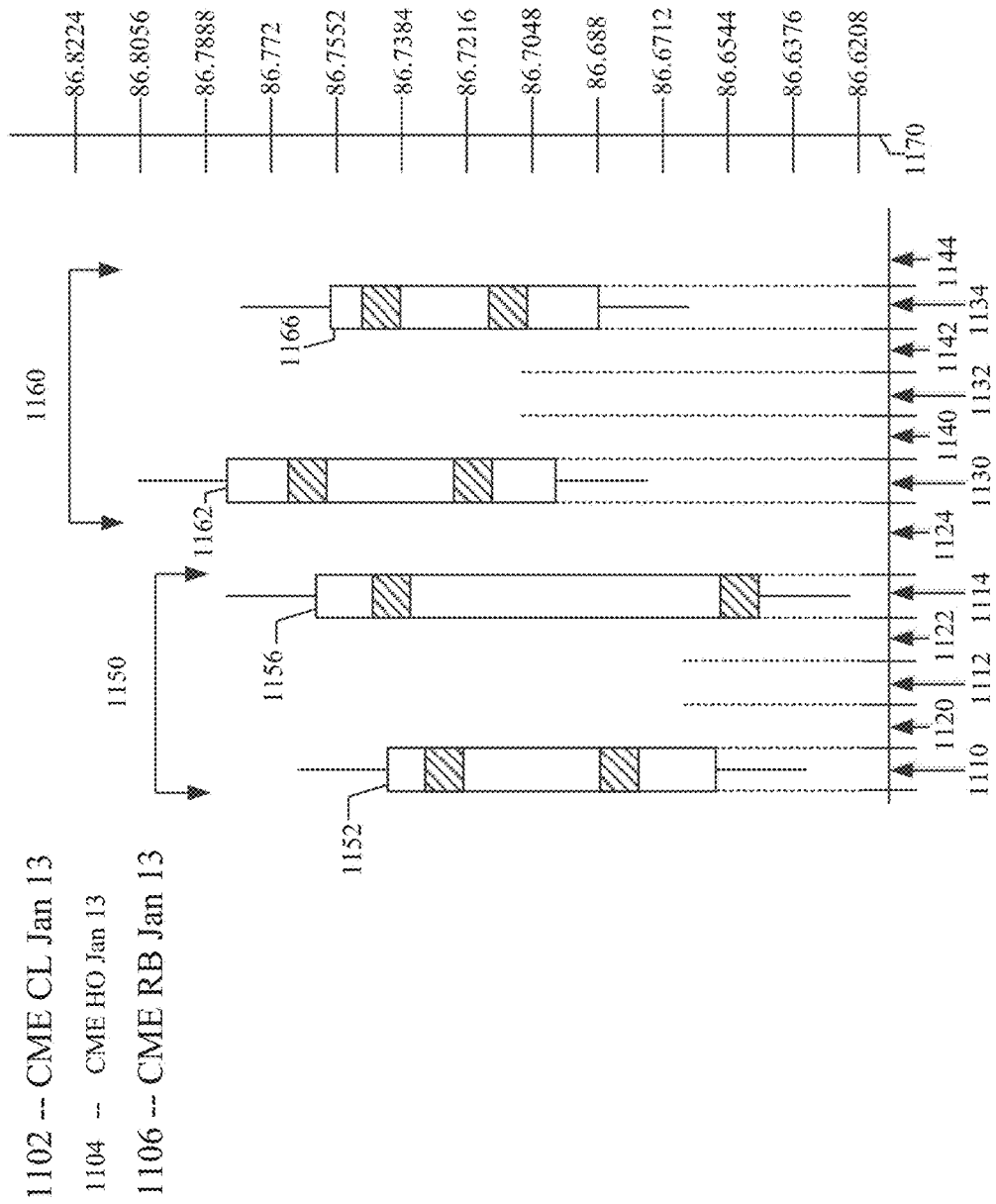

FIGS. 11A and 11B illustrate an example embodiment of a relationship display 1100. The relationship display 1100 illustrates the concept of aligning tradeable object bars for different tradeable objects adjacent to (e.g., next to) each other in distinct X-Axis locations or slots. This is beneficial because the tradeable objects may be analyzed as grouped and linked contiguous information sets across the field of a single display window adjacent to the same normalized axis.

As shown in FIG. 11A, tradeable object bar 1152 represents tradeable object 1102, tradeable object bar 1154 represents tradeable object 1104, and tradeable object bar 1156. FIG. 11A illustrates the spacing of the tradeable object bars in a relationship bar, such that there is no overlap or overlay of the tradeable object bars. In the example of FIG. 11A, the tradeable object bar widths 1110, 1112, 1114, for example, are the same or similar. For example, the tradeable object bar widths 1110, 1112, 1114 are the same or similar number of pixels on the GUI.

In some embodiments, one, some, or all of the tradeable object bar widths 1110, 1112, 1114 are differing sizes. For example, the width of each individual tradeable object bar may be a function of the volume traded within that bar. As such the width could be altered by a formulaic factor where each pixel beyond the base column width could represent a certain amount of volume. When this is done, any pixel add on would need to be remembered and subtracted from the next calculation of the X axis location of the subsequent tradeable object bar.

In some embodiments, a tradeable object bar may be enabled to expand its width when its volume exceeded 300 contracts and then the width would be expanded by 1 pixel for every 100 contracts thereafter up to some pre-configured maximum width then when the tradeable object bar volume becomes greater than 400 the drawn bar width would expand by 1 pixel and so on. This additional pixel width is then subtracted from the subsequent x axis coordinate location for the drawing of the next tradeable object bar.

The spacing 1120, 1122 between tradeable object bars may be same or similar. The spacing 1120, 1122 may be such that the tradeable object bars do not overlap or overlay each other when side-by-side (e.g., at the same horizontal location). In some embodiments, the spacing 1120, 1122 between tradeable object bars may be different.

The spacing 1124 between relationship bars 1150, 1160 may be the same or similar. The spacing 1120, 1122 may such that the relationship bars do not overlap or overlay each other when side-by-side (e.g., at the same horizontal location). In some embodiments, the spacing 1124 may be different than the spacing between other relationship bars.

In some embodiments, a base column width is set for each tradeable object. For example the base column width may be set to 4 pixels multiplied by the number of tradeable objects in the relationship configuration. If 3 tradeable objects are selected to be included then the base column width would be equal to 3*4=12 pixels. The base column width may be set to any number of pixels>=1 so as to allow for a usable display of the desired data points for each tradeable object and in fact may be user adjustable on the fly via the provided user interface mechanisms.

For each refresh of the display a check is done to calculate the number of base column widths (column count) that can fit into the view able area of the display window to adjust for any changes to the window size since the last refresh of the window. This calculation is the rightmost X location of the window as a whole minus the leftmost margin minus any right margin used to display any price scale or other information all divided by the base column width calculated previously. Specifically if the total window size is calculated to be graph right (e.g., =600 pixels from the leftmost edge of the window, graph left=0 pixels, graph right margin=100 pixels, tradeable object base column width=12 pixels then the column count=(600−0−100/12=41.6667 columns available to draw tradeable object bars).

In some embodiments, the drawing loop will stop after up to 41 tradeable object bars have been drawn in the visible space depending on how many tradeable object bars have been created since the display was initialized including any additional X Axis scaling adjustments the user may have made since initialization. If the user manually changes by whatever user interface is provided each base column bar width a smaller number of pixels, more may fit and if the user makes the base column bar width a larger number of pixels, fewer bars may fit in the view able area of the window. Once the baseline spacing is established, the drawing can begin starting with the most recent relationship bar and specifically the right most tradeable object within the rightmost relationship bar.

In some embodiments, the rightmost relationship bar indicate the most recent tradeable object bars created. The tradeable objects are selected to draw in the order so configured by the user. The last listed in the configuration is the first drawn until the first listed in the configuration is drawn and then the same procedure is completed on the next relationship bar until all available relationship bars have been drawn or until there is not any visible space left to draw additional relationship bars. For example if tradeable objects CL (Crude Oil), HO (Heating Oil), and RB (Gasoline) were listed in the configuration in this specific order, RB would be drawn first, then HO to it's left and finally CL leftmost within each relationship bar within the spacing available for each relationship bar in succession until there is either no more data to draw or the number of bars drawn as a whole use up the available space. This example should not be considered limiting as the bars can be drawn in any order desired depending upon user preference. For example an additional configuration parameter can be added to denote the explicit order of drawing the user wants.

In an example, the first tradeable object may be drawn with an initial X coordinate at an offset number of pixels, for example, less than 5 pixels from the edge of the right margin location set to 100 above. Then each bar is drawn in succession to the left of the already drawn bars at an offset in pixels equal to the current bar width considering any user scaling adjustments minus a buffer of either 4 pixels or 8 pixels depending on whether the user has chosen to include certain studies such as the volume and net change analog displays (when selected the buffer is 8 pixels) so as to allow the relationship display to slide up in between the tradeable object bars within each relationship bar so as to allow each tradeable object's study data to be immediately adjacent to the tradable object bar for instantaneous associative comparison and observation. An additional buffer of 8-15 pixels may be included in between each relationship bar and commonly indicated with a 1 pixel wide divider line approximately in the center of the buffer between the relationship bars, for example.

In some embodiments, a relationship display may display only those tradeable object bars that are selected. For example, as shown in FIG. 11B, tradeable objects 1102 and 1106 are selected. Selection shown in FIG. 11B with the large font. A user may select or de-select a tradeable object by clicking on the tradeable object. For example, the user may have clicked on tradeable object 1104 to de-select that tradeable object. De-selection shown in FIG. 11B with smaller font. When selected, the corresponding tradeable object bars are displayed on the relationship display. When not selected (e.g., de-selected), the corresponding tradeable objects are not displayed. In the example of FIG. 11B, tradeable object bars 1152, 1156, 1162, 1166 are displayed because tradeable objects 1102, 1106 are selected. Tradeable object bars 1154, 1164 are not displayed because tradeable object 1104 is de-selected. Clicking on tradeable object 1104 may select it again and it will reappear on the relationship display. When tradeable object bars are de-selected, the spacing between the tradeable object bars may remain the same or it may change (e.g., be condensed).

FIG. 12 illustrates an embodiment of a relationship display 1200. The relationship display includes a combination of a line chart and a bar chart in accordance with an embodiment. The line chart may represent market data, such as the volume weighted average price (VWAP), midpoint, open, close, or other information relating to a tradeable object or any combination thereof. Specifically, whereas new tradeable object bars may be created before any trades take place in the current object bar, no VWAP, High Low, etc is available to reference. In such cases VWAP may be linked with the bid/ask midpoint in a waterfall fashion and become part of any line or other display linking data across multiple objects across multiple relationship bars. For example, as shown in FIG. 12, the relationship display 1200 includes a line chart interface and a bar chart interface. The line chart interface includes a line 1212 representing the VWAP (or bid ask midpoint when VWAP is not calculable for that bar) for tradeable object 1202. The line 1212 connects to the tradeable object 1222, which also represents tradeable object 1202, in the bar chart interface. The line chart interface includes a line 1214 representing the VWAP for tradeable object 1204. The line 1214 connects to the tradeable object 1224, which also represents tradeable object 1204, in the bar chart interface. The line chart interface includes a line 1216 representing the VWAP for tradeable object 1206. The line 1216 connects to the tradeable object 1226, which also represents tradeable object 1206, in the bar chart interface.

The lines 1212-1216 may be converted in accordance with an embodiment to be associated with the normalized axis 1260. For example, the pricing of tradeable objects 1204, 1206 may be converted using the pricing of tradeable object 1202 as the anchor. In addition any line chart may be substituted for some or all bar displays where there are two or more bar groups in conjunction with lines up to and or through the bars and lines only displays with no visible bars.

In some embodiments, the relationship display 1210 may include one or more relationship bar indicators 1210. One or more relationship bar indicators 1210 may indicate where a relationship bar has stopped and a new relationship bar has begun. In the example of FIG. 12, the relationship bar indicator 1210 may be a solid line that separates the relationship bars. For example, although FIG. 12 indicates a line bar combo, the relationship display 1210 may still indicate the relationship bar sections by vertically slicing through the lines so that the user can still get a sense of where the relationship bars are and what sections of the lines correspond to each relationship bar.

v. Electronic Trading System

Figure 13:
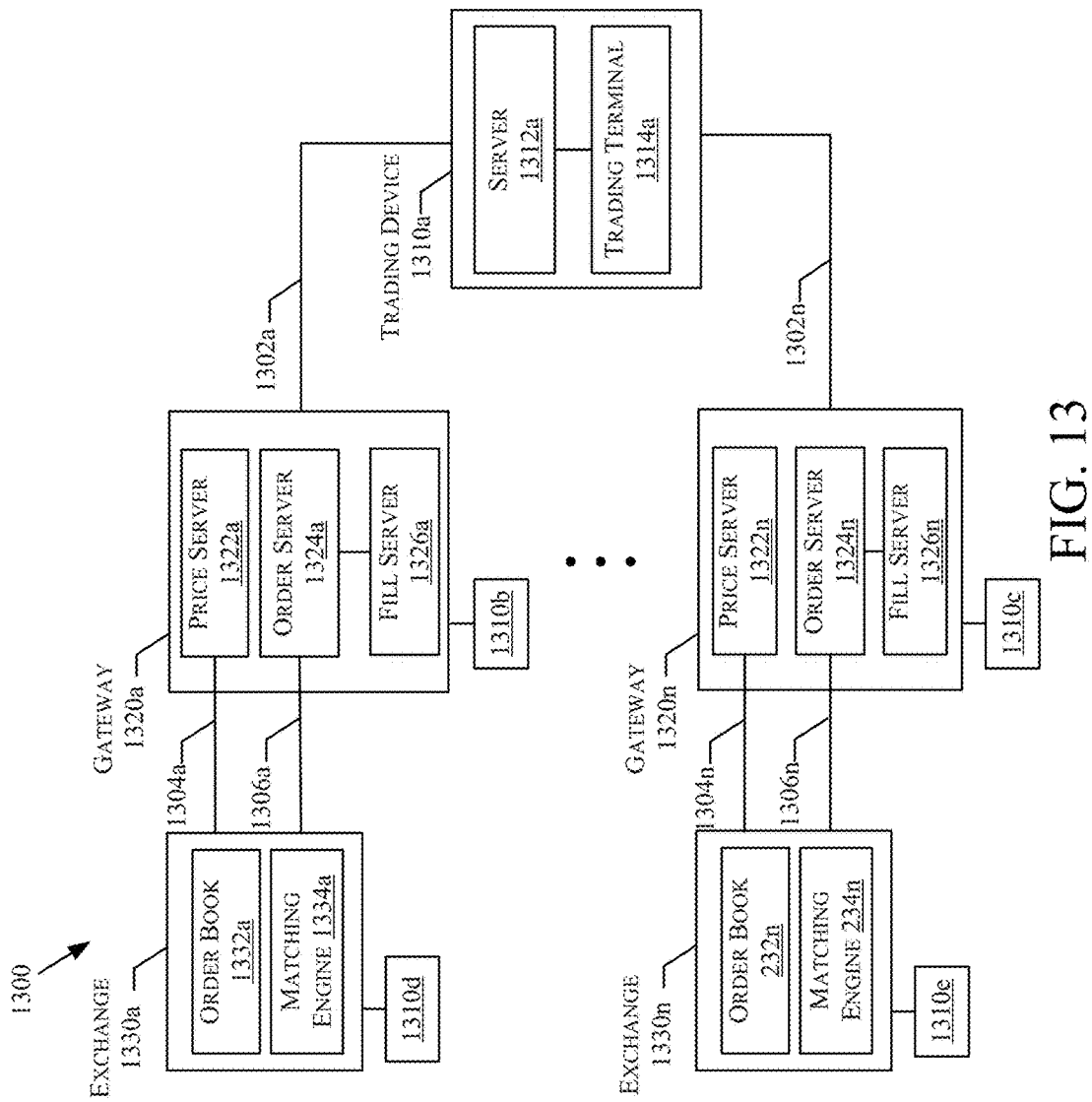
FIG. 13 illustrates a block diagram representative of an example electronic trading system in which certain embodiments may be employed.

FIG. 13 illustrates a block diagram of an exemplary electronic trading system 1300 in which certain embodiments may be employed. In some embodiments, the electronic trading system 1300 is an expansion of one or more embodiments of the electronic trading system 100 of FIG. 1. As a result, one or more components in system 1300 may be the same or similar as one or more components in system 100.

Certain automated trading tools—such as ADL™, AUTOSPREADER®, and/or AUTOTRADER™ provided by Trading Technologies International, Inc. of Chicago, Ill. ("Trading Technologies")—may be used in conjunction with certain embodiments disclosed herein. For example, in some embodiments, a relationship display may be provided with AUTOSPREADER®, which provides users with the ability to enter orders for various spread relationships. In another example, ADL™ may be used to configure or monitor a relationship that is displayed on a relationship display.

In the example of FIG. 13, a trading device 1310a is in communication with an exchange 1330a through a gateway 1320a. The following discussion mainly focuses on the trading device 1310a, gateway 1320a, and the exchange 1330a. However, the trading device 1310a may also be connected to and communicate with any number of gateways 1320n connected to any number of exchanges 1330n. The communication between the trading device 110a and other exchanges 1330n may be the same, similar, or different than the communication between the trading device 1310a and exchange 1330a. Generally, each exchange has its own preferred techniques and/or formats for communicating with a trading device, a gateway, the user, or another exchange.

The trading device 1310a may be similar to the trading device 110 in FIG. 1. The trading device 1310a may include one or more electronic computing platforms. For example, the trading device 1310a may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 1310a may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

In some embodiments, the trading device 1310a may be implemented as a personal computer running a copy of X_TRADER®, an electronic trading platform provided by Trading Technologies or a copy of X_Study®, an electronic trading charting application provided by Trading Technologies. As another example, the trading device 1310a may be a server running a trading application providing automated trading tools such as ADL™, AUTOSPREADER®, and/or AUTOTRADER™, also provided by Trading Technologies. In yet another example, the trading device 1310a may include a trading terminal in communication with a server, where collectively the trading terminal and the server are the trading device 1310a.

The trading device 1310a is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 1310a may include one or more trading applications. As used herein, a trading application is an application that facilitates or improves electronic trading. A trading application provides one or more electronic trading tools. For example, a trading application stored by a trading device may be executed to arrange and display market data in one or more trading windows or interfaces. In another example, a trading application may include a charting application that charts multiple markets. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens or charts. A trading screen may provide one or more trading tools that allow interaction with one or more markets. A trading chart may provide one or more charts displaying one or more tradeable objects. For example, a trading tool may allow a user to obtain and view market data, set order entry parameters, submit order messages to an exchange, deploy trading algorithms, and/or monitor positions while implementing various trading strategies. An example of a trading tool may be a value axis. The trading tool may be included as part of a trading interface. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 1310a from another computer readable medium. For example, the trading application (or updates to the trading application) may be stored by a manufacturer, developer, or publisher on one or more CDs or DVDs, which are then loaded onto the trading device 1310a or to a server from which the trading device 1310a retrieves the trading application. As another example, the trading device 1310a may receive the trading application (or updates to the trading application) from a server, for example, via the Internet or an internal network. The trading device 1310a may receive the trading application or updates when requested by the trading device 1310a (for example, "pull distribution") and/or unrequested by the trading device 1310a (for example, "push distribution").

The trading device 1310a may be adapted to send order messages. For example, the order messages may be sent to through the gateway 120 to the exchange 130. As another example, the trading device 1310a may be adapted to send order messages to a simulated exchange in a simulation environment which does not effectuate real-world trades. As another example, the order messages may be sent by interacting with a relationship display. For example, in some embodiments, a user may select (e.g., click) a relationship bar indicator to place an order to buy or sell the tradeable objects (e.g., as a group) represented by the relationship bar. In another example, a user may select individual tradeable objects by selecting (e.g., clicking) the corresponding tradeable object bars.

The order messages may be sent at the request of a user. For example, a trader may utilize the trading device 1310a to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 1310a to the exchange 1330a through the gateway 1320a. The trading device 1310a may communicate with the gateway 1320a using a local area network, a wide area network, a wireless network, a virtual private network, a T1 line, a T3 line, an integrated services digital network ("ISDN") line, a point-of-presence, the Internet, and/or a shared memory system, for example.

The trading device 1310a may be adapted to send other messages. For example, the trading device 1310a may send a message to the gateway 1320a requesting coalesced market data. In response, the gateway 1320a would respond with the coalesced market data.

As shown in FIG. 13, the trading device 1310a may include a server 1312a in communication with a trading terminal 1314a. The server 1312a may be located geographically closer to the gateway 120 than the trading terminal 1314a. As a result, the server 1312a may have latency benefits that are not afforded to the trading terminal 1314*a*. In operation, the trading terminal 1314*a* may provide a trading screen to a user and communicate commands to the server 1312*a* for further processing. For example, a trading algorithm may be deployed to the server 1312*a* for execution based on market data. The server 1312*a* may execute the trading algorithm without further input from the user. In another example, the server 1312*a* may include a trading application providing automated trading tools and communicate back to the trading terminal 1314*a*. The trading device 1310*a* may include, additional, different, or fewer components.

In some embodiments, the trading device 1310*a* may include one or more trading applications that chart multiple markets in accordance with an embodiment herein. For example, the trading terminal 1314*a* may include a trading application that converts the price scales for non-anchor objects to a price scale for an anchor objects and charts a corresponding tradeable object bar in accordance with an embodiment. In another example, the trading terminal 1314*a* may include a trading application that generates new relationship bars in accordance with an embodiment set forth herein.

The trading device 1310*a* may communicate with the gateway 1320*a* using one or more communication networks. As used herein, a communication network is any network, including the Internet, which facilitates or enables communication between, for example, the trading device 1310*a*, the gateway 1320*a* and the exchange 1320*a*. For example, as shown in FIG. 13, the trading device 1310*a* may communicate with the gateway 1320*a* across a multicast communication network 1302*a*. The data on the network 1302*a* may be logically separated by subject (for example, prices, orders, or fills). As a result, the server 1312*a* and trading terminal 1314*a* can subscribe to and receive data (for example, data relating to prices, orders, or fills) depending on their individual needs.

The gateway 1320*a*, which may be similar to the gateway 120 of FIG. 1, may include a price server 1322*a*, order server 1324*a*, and fill server 1326*a*. The gateway 1320*a* may include additional, different, or fewer components. The price server 1322*a* may process price data. Price data includes data related to a market for one or more tradeable objects. The order server 1324*a* may process order data. Order data is data related to a user's trade orders. For example, order data may include order messages, confirmation messages, or other types of messages. The fill server collects and provides fill data. Fill data includes data relating to one or more fills of trade orders. For example, the fill server 1326*a* may provide a record of trade orders, which have been routed through the order server 1324*a*, that have and have not been filled. The servers 1322*a*, 1324*a*, 1326*a* may run on the same machine or separate machines.

The gateway 1320*a* may communicate with the exchange 1330*a* using one or more communication networks. For example, as shown in FIG. 13, there may be two communication networks connecting the gateway 1320*a* and the exchange 1330*a*. The network 1304*a* may be used to communicate market data to the price server 1322*a*. In some instances, the exchange 1330*a* may include this data in a data feed that is published to subscribing devices. The network 1306*a* may be used to communicate order data. The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 1320*a* may facilitate communication. For example, the gateway 1320*a* may perform protocol translation for data communicated between the trading device 1310*a* and the exchange 1330*a*. The gateway 1320*a* may process an order message received from the trading device 1310*a* into a data format understood by the exchange 1330*a*, for example. Similarly, the gateway 1320*a* may transform market data in an exchange-specific format received from the exchange 1330*a* into a format understood by the trading device 1310*a*, for example.

The gateway 1320*a* may include a trading application, similar to the trading applications discussed above, that facilitates or improves electronic trading.

In certain embodiments, the gateway 1320*a* communicates with the exchange 130 using a local area network, a wide area network, a virtual private network, a T1 line, a T3 line, an ISDN line, a point-of-presence, the Internet, and/or a shared memory system, for example.

The exchange 1330*a*, which may be similar to the exchange 130 of FIG. 1, may include an order book 1332*a* and a matching engine 1334*a*. The exchange 1330*a* may include additional, different, or fewer components. The order book 1332*a* is a database that includes data relating to unmatched quantity of trade orders. For example, an order book may include data relating to a market for a tradeable object, such as the inside market, market depth at various price levels, the last traded price, and the last traded quantity. The matching engine 1334*a* may match contra-side bids and offers. For example, the matching engine 1334*a* may execute one or more matching algorithms that match contra-side bids and offers. A sell order is contra-side to a buy order with the same price. Similarly, a buy order is contra-side to a sell order with the same price.

In operation, the exchange 1330*a* may provide price data from the order book 1332*a* to the price server 1322*a* and order data and/or fill data from the matching engine 1334*a* to the order server 1324*a*. Servers 1322*a*, 1324*a*, 1326*a* may translate and communicate this data back to the trading device 1310*a*. The trading device 1310*a*, for example, using a trading application, may process this data. For example, the data may be displayed to a user. In another example, the data may be utilized in a trading algorithm to determine whether a trade order should be submitted to the exchange 1330*a*. The trading device 1310*a* may prepare and send an order message to the exchange 1330*a*.

The exchange 1330*a* may be owned, operated, controlled, or used by an exchange entity. Example exchange entities include the CME Group, the London International Financial Futures and Options Exchange, the Intercontinental Exchange, and Eurex. The exchange 1330*a* may include an electronic matching system, such as a computer, server, or other computing device, which is adapted to allow tradeable objects, for example, offered for trading by the exchange, to be bought and sold. For example, the exchange 1330*a* may be the CME Globex platform owned by the CME Group or the ICE platform owned by the IntercontinentalExchange (ICE). The exchange 1330*a* may include separate entities, some of which list and/or administer tradeable objects and others which receive and match orders, for example. The exchange 1330*a* may include an electronic communication network ("ECN"), for example.

The exchange 1330*a* may be an electronic exchange. The exchange 1330*a* is adapted to receive order messages and match contra-side trade orders to buy and sell tradeable objects. Unmatched trade orders may be listed for trading by the exchange 1330a. The trade orders may include trade orders received from the trading device 110 or other devices in communication with the exchange 1330a, for example. For example, typically the exchange 1330a will be in communication with a variety of other trading devices (which may be similar to trading device 110) which also provide trade orders to be matched.

The exchange 1330a is adapted to provide market data. Market data may be provided in one or more messages or data packets or through a shared memory system. For example, the exchange 1330a may publish a data feed to subscribing devices, such as the trading device 110 or gateway 120. The data feed may include market data.

In certain embodiments, the gateway 1320a is part of the trading device 1310a. For example, the components of the gateway 1320a may be part of the same computing platform as the trading device 1310a. As another example, the functionality of the gateway 1320a may be performed by components of the trading device 1310a. In certain embodiments, the gateway 1320a is not present. Such an arrangement may occur when the trading device 1310a does not need to utilize the gateway 1320a to communicate with the exchange 1330a, for example. For example, if the trading device 1310a has been adapted to communicate directly with the exchange 1330a.

Additional trading devices 1310b-1310e, which are similar to trading device 1310a, may be connected to one or more of the gateways 1320a-1320n and exchanges 1330a-1330n. Furthermore, additional gateways, similar to the gateway 1320a, may be in communication with multiple exchanges, similar to the exchange 1330a. Each gateway may be in communication with one or more different exchanges, for example. Such an arrangement may, for example, allow one or more trading devices 1310a to trade at more than one exchange (and/or provide redundant connections to multiple exchanges).

The electronic trading system of FIG. 1 and/or the electronic trading system of FIG. 13 may include additional, different, or fewer components. The system 100 and/or system 1300 may include additional, different, or fewer components. For example, electronic trading system 100 and/or 1300 may include multiple trading devices, gateways, and/or exchanges. In another example, the system 100 and/or 1300 may include other communication devices, such as middleware, firewalls, hubs, switches, routers, servers, exchange-specific communication equipment, modems, security managers, and/or encryption/decryption devices.

vi. Computing Device

Figure 14:
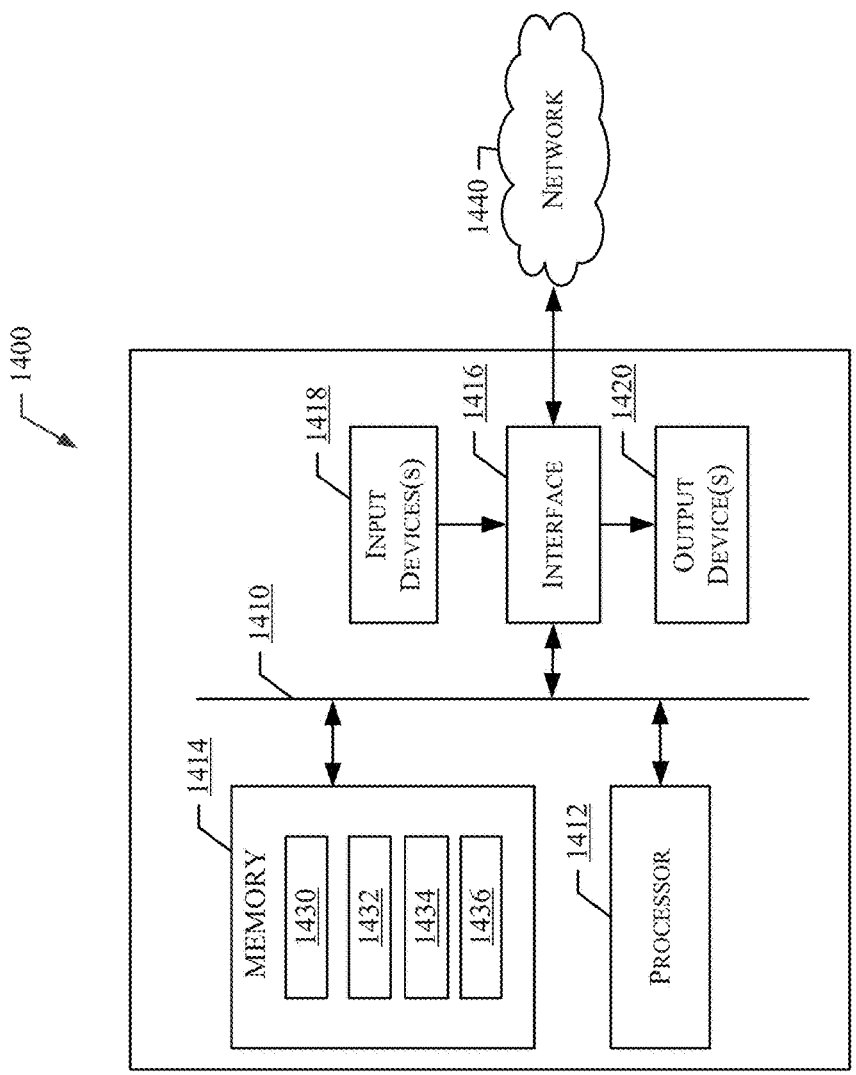
FIG. 14 illustrates a block diagram representative of an example trading device in which certain embodiments may be employed.

FIG. 14 illustrates a block diagram of an example computing device 1400 which may be used to implement the disclosed embodiments. The trading device 110 of FIG. 1 or the trading device 1310a of FIG. 13, for example, may include one or more computing devices 1400. The gateway 120 of FIG. 1 or the gateway 1320a of FIG. 13 may include one or more computing devices 1400, for example. The exchange 130 of FIG. 1 or the exchange 1330a of FIG. 13 may include one or more computing devices 1400, for example.

The computing device 1400 includes a communication network 1410, a processor 1412, a memory 1414, an interface 1416, an input device 1418, and an output device 1420. The computing device 1400 may include additional, different, or fewer components. For example, multiple communication networks, multiple processors, multiple memory, multiple interfaces, multiple input devices, multiple output devices, or any combination thereof, may be provided.

The communication network 1414 may include a communication bus, channel, electrical or optical network, circuit, switch, fabric, or other mechanism for communicating data between components in the computing device 1400. The communication network 1410 may be communicatively coupled with and transfer data between any of the components of the computing device 1400. One or more of the other components may be coupled to the communication network 1410. For example, the processor 1412 may communicate with the memory 1414 and/or interface 1416 via the communication network 1410.

The processor 1412 may be any suitable processor, processing unit, or microprocessor. The processor 1412 may include one or more general processors, digital signal processors, application specific integrated circuits, field programmable gate arrays, analog circuits, digital circuits, programmed processors, and/or combinations thereof, for example. The processor 1412 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 1400 is a multi-processor system and, thus, may include one or more additional processors which are communicatively coupled to the communication network 1414.

The processor 1412 may be operable to execute logic and other computer readable instructions encoded in one or more tangible media, such as the memory 1414. As used herein, logic encoded in one or more tangible media includes instructions which may be executable by the processor 1412 or a different processor. The logic may be stored as part of software, hardware, integrated circuits, firmware, and/or micro-code, for example. The logic may be received from an external communication device via a communication network such as the network 1440. The processor 1412 may execute the logic to perform the functions, acts, or tasks illustrated in the figures or described herein.

The memory 1414 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 1414 may include any desired type of mass storage device including hard disk drives, optical media, magnetic tape or disk, etc.

The memory 1414 may include one or more memory devices. For example, the memory 1414 may include local memory, a mass storage device, volatile memory, non-volatile memory, or a combination thereof. The memory 1414 may be adjacent to, part of, programmed with, networked with, and/or remote from processor 1412, so the data stored in the memory 1414 may be retrieved and processed by the processor 1412, for example. The memory 1414 may store instructions which are executable by the processor 1412. The instructions may be executed to perform one or more of the acts or functions described herein or shown in the figures. For example, the instructions may be executed by a processor, such as the processor 1412, to implement a method, such as all or a portion of the methods shown in FIGS. 15-18.

The memory 1414 may store one or more trading applications. In certain embodiments, the one or more trading applications may be accessed from or stored in different locations. The processor 1412 may access the one or more trading applications stored in the memory 1414 and execute computer-readable instructions included therein.

In an example, the memory 1414 may include a trading application 1430 that includes instructions for charting multiple markets along a normalized price axis. The trading application 1430 may include instructions, which when executed by a processor receive market data for a plurality of tradeable objects, select tradeable objects to be displayed, convert non-anchor price data based on anchor price data, and/or display converted non-anchor price data and anchor price data.

In an example, the memory 1414 may include a trading application 1432 that includes instructions for converting the price scales of non-anchor objects. The trading application 1432 may include instructions, which when executed by a processor receive market data for a plurality of tradeable objects, determine a normalization delta for each non-anchor object using an anchor price for an anchor object, and normalize non-anchor prices based on the normalization deltas In an example, the memory 1414 may include a trading application 1434 that includes instructions for displaying multiple markets along a normalized price axis. The trading application 1434 may include instructions, which when executed by a processor display one or more normalized price axes, display one or more relationship bar, display one or more trigger level interfaces, and/or display one or more multiple market study interfaces.

In an example, the memory 1414 may include a trading application 1436 that includes instructions for generating a new relationship bar. The trading application 1436 may include instructions, which when executed by a processor set a trigger level, set a trigger object, determine whether attributes of the trigger object satisfy the trigger level, generate a new relationship bar, and/or reset the attributes of the trigger object.

In certain embodiments, during an installation process, the trading application may be transferred from the input device 1418 and/or the network 1440 to the memory 1414. When the computing device 1400 is running or preparing to run the trading application 1430, the processor 1412 may retrieve the instructions from the memory 1414 via the communication network 1414.

vii. Exemplary Methods for Charting Multiple Markets

Figure 15:
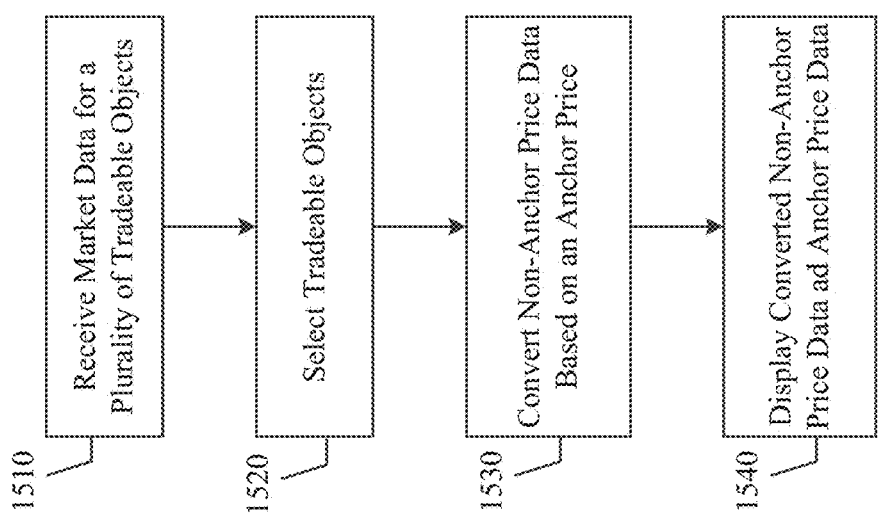
FIG. 15 illustrates a block diagram of a method for charting multiple markets along a normalized price axis.

FIG. 15 illustrates a block diagram of a method 1500 for charting multiple markets. The method 1500 may be implemented by any of an apparatus (e.g., the trading device 110, gateway 120, or electronic exchange 130 of FIG. 1), a system (e.g., system 100 of FIG. 1), a computer program, a computer readable medium, or a combination thereof.

With respect to method 1500, changes and modifications, such as additional, different, or fewer acts, may be made to the process shown in FIG. 15 without departing from the spirit and scope of certain inventive aspects described herein. The acts shown in FIG. 15 may be performed in the order shown or a different order.

In act 1510, a computing device receives market data for a plurality of tradeable objects. Receiving the market data may include receiving the market data from an electronic exchange (e.g., via a gateway), retrieving the market data from memory (e.g., a storage device), or otherwise gaining access to the market data. The market data may be received from different locations.

In act 1520, the computing device selects the tradeable objects to be displayed. The tradeable objects may be selected from a list of available tradeable objects, for example, for which there is market data. In some embodiments, selecting the tradeable objects may include receiving input. For example, a mouse, keyboard, or other input device may be used to select the tradeable objects. In some embodiments, the tradeable objects are predefined. For example, upon launching a relationship display, certain tradeable objects may be automatically selected.

Selecting the tradeable objects may include selecting an anchor object. The anchor object may be selected from a list of tradeable objects, for example, that were previously selected. In some embodiments, selecting the anchor object may include receiving input. For example, a mouse, keyboard, or other input device may be used to select the anchor object. In some embodiments, the anchor object is predefined. After selecting tradeable objects, an anchor object may be automatically selected.

In some embodiments, non-anchor objects are selected. Selecting non-anchor objects may include selecting the tradeable objects that were originally selected but were not selected as the anchor object.

Selecting the tradeable objects may also include configuring the tradeable objects to be displayed. Configuring may include receiving a multiplier for each tradeable objects and associating the multiplier with the tradeable object. Configuring may also include receiving new relationship bar triggering logic including but not limited to type of trigger and the parameters to monitor to make any trigger(s) functional. Configuring may also include configuring one or more multiple market studies.

In act 1530, the computing device may convert one or more non-anchor prices to based on an anchor price. A non-anchor price may be a price for a non-anchor object. An anchor price may be a price for the selected anchor object. Converting a non-anchor price may be based on the price for the non-anchor object, the multiplier for the non-anchor object, and a normalization delta for the non-anchor object. The normalization delta for the non-anchor object may be based on the anchor price of the anchor object.

In act 1540, the computing device may display multiple markets on a chart including a normalized price axis. Displaying multiple markets may include displaying prices for an anchor object and converted prices for the non-anchor objects on a chart. Displaying prices for an anchor object and converted prices for the non-anchor objects may include graphically representing the price values relative to one or more normalized price axes. In some embodiments, relationship bars are displayed. Displaying a relationship bar may include displaying tradeable object bars that represent the one or more tradeable objects during a period of time associated with the relationship bar. Tradeable object bars may be charted relative to a normalized price axis but do not overlap or overlay each other. In other embodiments, lines or other indicia representing attributes of a tradeable object may be displayed in a fashion so as to indicate relative states or conditions of and among the set of tradeable objects.

Figure 16:
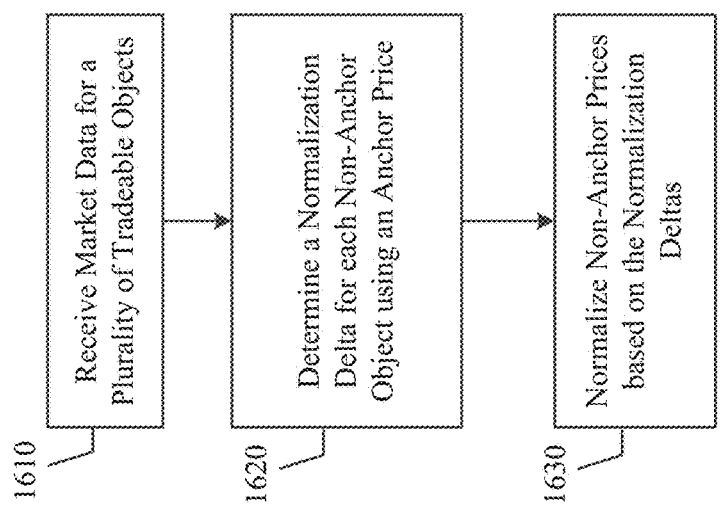
FIG. 16 illustrates a block diagram of a method for converting the price scales of non-anchor objects.

FIG. 16 illustrates a block diagram of a method 1600 for converting a price scale for one or more non-anchor objects. The method 1600 may be implemented by any of an apparatus (e.g., the trading device 110, gateway 120, or electronic exchange 130 of FIG. 1), a system (e.g., system 100 of FIG. 1), a computer program, a computer readable medium, or a combination thereof.

With respect to method 1600, changes and modifications, such as additional, different, or fewer acts, may be made to the process shown in FIG. 16 without departing from the spirit and scope of certain inventive aspects described herein. The acts shown in FIG. 16 may be performed in the order shown or a different order.

In act 1610, an anchor price may be determined. The anchor price of the selected anchor object is a selected price unit that will be used to calculate the adjustment (e.g., delta) for each of the non-anchor objects. As explained in more detail below, this adjustment will be different based on which anchor object is selected. An anchor price may be the midpoint price, best bid or ask, open or close price, VWAP, or any information based element that is included in or can be derived from market data. In some embodiments, as will be discussed below, the anchor price is the point of alignment.

In some embodiments, the anchor price is the midpoint of the current bid/ask spread (which may be referred to as the "bid/ask midpoint" or sometimes "midpoint"). Using market data received from an exchange, such as the electronic exchange 130 of FIG. 1, a trading device may determine the bid/ask midpoint for each tradeable object that is or will be displayed on the relationship display. The bid/ask midpoint price is calculated, as shown in Equation 1, by subtracting the last bid price from the last ask price and dividing that by 2 and adding on the last bid price.

$$\text{midpoint\_price} = (\text{last\_ask} - \text{last\_bid})/2 + \text{last\_bid} \quad \text{Equation 1:}$$

In act 1620, the computing device logically changes the anchor prices of the non-anchor objects to units that are comparable to the anchor prices of the anchor objects. In some embodiments, normalizing the non-anchor objects is based on the anchor price of the anchor object, a non-anchor multiplier, and the anchor price for the non-anchor object. In some embodiments, the normalized midpoint price for a non-anchor object may be determined by calculating a normalization delta for a non-anchor object. The normalization delta may be used to adjust the anchor price for the non-anchor objects. The normalization delta for a non-anchor object may be calculated by subtracting the product of the midpoint price and multiplier of the anchor object from the product of the midpoint price and multiplier of the non-anchor object.

$$\text{normalization\_delta}(\text{non-anchor object } 1) = \text{midpoint\_price}(\text{non-anchor object } 1)*\text{multiplier}(\text{non-anchor object } 1) - \text{midpoint price}(\text{anchor object})*\text{multiplier}(\text{anchor object}) \quad \text{Equation 2}$$

The computing device may convert units of non-anchor objects to the units of the anchor objects, so they can be compared. For example, the unit measurement for the non-anchor object may be gallons and the unit measurement for the anchor object may be barrels. In act 1620, the computing device may convert the price in gallons to a price in barrels, such that they may be compared.

In act 1630, the computing device determines a normalized anchor price for each of the non-anchor objects. The normalization deltas may be used to determine a normalized anchor price for each of the non-anchor objects. A normalized anchor price may be calculated using the high price for a non-anchor object, the non-anchor multiplier, and the normalization delta. For example, Equation 3 may be used to determine the normalized anchor price for non-anchor objects.

$$\text{normalized\_high\_price}(\text{object } n) = \text{high\_price}(\text{object } n)*\text{multiplier}(\text{object } n) - \text{normalization\_delta}(\text{object } n). \quad \text{Equation 3}$$

Figure 17:
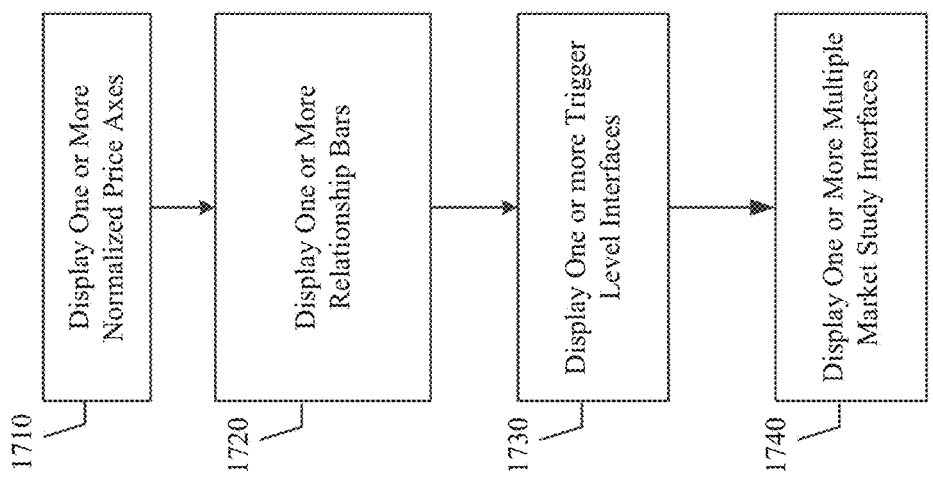
FIG. 17 illustrates a block diagram of a method for displaying multiple markets along a normalized price axis.

FIG. 17 illustrates a block diagram of a method 1700 for displaying multiple markets on a chart including a normalized price axis. The method 1700 may be implemented by any of an apparatus (e.g., the trading device 110, gateway 120, or electronic exchange 130 of FIG. 1), a system (e.g., system 100 of FIG. 1), a computer program, a computer readable medium, or a combination thereof.

With respect to method 1700, changes and modifications, such as additional, different, or fewer acts, may be made to the process shown in FIG. 17 without departing from the spirit and scope of certain inventive aspects described herein. The acts shown in FIG. 17 may be performed in the order shown or a different order.

In act 1710, a computing device may display one or more normalized price axes.

In act 1730, the computing device may display one or more relationship bars. For example, a first relationship bar may be charted on the bar chart including a normalized price axis. The first relationship bar may include a first plurality of tradeable object bars that represent a plurality of tradeable objects during a first period of time. The first plurality of tradeable object bars may be plotted and move relative to the normalized price axis. When a trigger level is satisfied, a second (new) relationship bar may be generated. The second relationship bar may include a second plurality of tradeable object bars that represent the plurality of tradeable objects during a second period of time and are plotted and move in accordance with the normalized price axis. The first period of time does not overlap the second period of time.

In act 1740, the computing device may display one or more trigger level interfaces. a trigger level interface that displays market data for the trigger object relative to a trigger level indicator, wherein the trigger level indicator indicates market data relative to a trigger level that triggers the generation of a second relationship bar when market data satisfies the trigger level. In some embodiments, the trigger level is non-time based. However, in some embodiments, the trigger level may be based, at least in part, on time. In some embodiments, the trigger level may be based on a formula and change from relationship bar to relationship bar. In some embodiments, the trigger level indicator may be a trigger bar with the top of the bar indicating that the trigger level was satisfied.

In act 1750, the computing device may display one or more multiple market study interfaces in accordance with an embodiment. A multiple market study interface may show relationship between tradeable objects. A relationship display in accordance with an embodiment herein provides for more accurate and in depth studies of the relationship between tradeable objects to be displayed. In particular, the layout of the tradeable objects on the relationship display is advantageous. The layout of the tradeable object bars allows for additional multiple market relationship information to be conveyed to a user.

Figure 18:
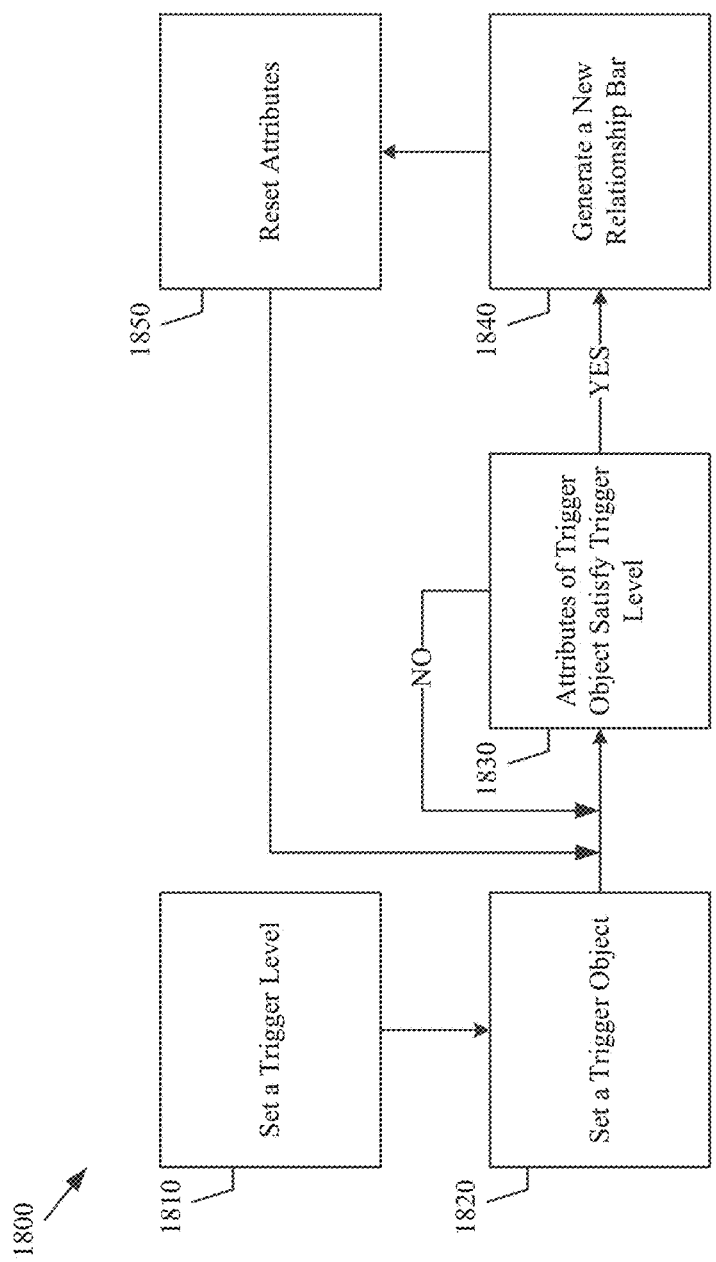
FIG. 18 illustrates a block diagram of a method for generating a new relationship bar.

FIG. 18 illustrates a block diagram of a method 1800 for generating a new relationship bar. The method 1800 may be implemented by any of an apparatus (e.g., the trading device 110, gateway 120, or electronic exchange 130 of FIG. 1), a system (e.g., system 100 of FIG. 1), a computer program, a computer readable medium, or a combination thereof.

With respect to method 1800, changes and modifications, such as additional, different, or fewer acts, may be made to the process shown in FIG. 18 without departing from the spirit and scope of certain inventive aspects described herein. The acts shown in FIG. 18 may be performed in the order shown or a different order.

In act 1810, a computing device sets a trigger level. Setting a trigger level may be based on input, for example, from a user. For example, a trigger level may include a defined threshold before a new relationship bar is generated. Exemplary trigger levels may include volume traded, net change, or other levels. In some embodiments, a trigger level is non-time based (e.g., volume traded or net change). However, in some embodiments, a trigger level may be based on time. A trigger level may be based on a combination of non-time based trigger levels and time based trigger levels. Setting a trigger level may include defining a formula that may change the trigger level based on certain criteria.

In act 1820, the computing device may set a trigger object. Setting a trigger object may include selecting a tradeable object, for example, from a list of tradeable objects to be charted. In some embodiments, an anchor object may be used as a trigger object.

In act 1830, the computing device determines whether attributes of the trigger object satisfy the trigger level. Satisfying the trigger level may include reaching or exceeding the trigger level. For example, if the trigger level is set to 2000 traded contracts. Satisfying the trigger level may include reaching 2000 traded contracts or exceeding this amount (e.g., 2022 traded contracts). If the attributes of the trigger object do not satisfy the trigger level, then the computing device continues checking whether the attributes of the trigger object satisfy the trigger level. However, if the attributes of the trigger object do satisfy the trigger level, then proceed to act 1840.

In act 1840, the computing device generates a new relationship bar in accordance with an embodiment. For example, in some embodiments, the relationship bar may include tradeable object bars and be logically connected to a normalized price axis.

In act 1850, the attributes are reset and the computing device may then begin to determine whether the attributes of the trigger object satisfy the trigger level in accordance with act 1830.

viii. Multiple Market Studies

A relationship display in accordance with an embodiment herein provides for more accurate and in depth studies of the relationship between tradeable objects to be displayed. In particular, the layout of the tradeable objects on the relationship display is advantageous. The layout of the tradeable object bars allows for additional multiple market relationship information to be conveyed to a user.

Figure 19:
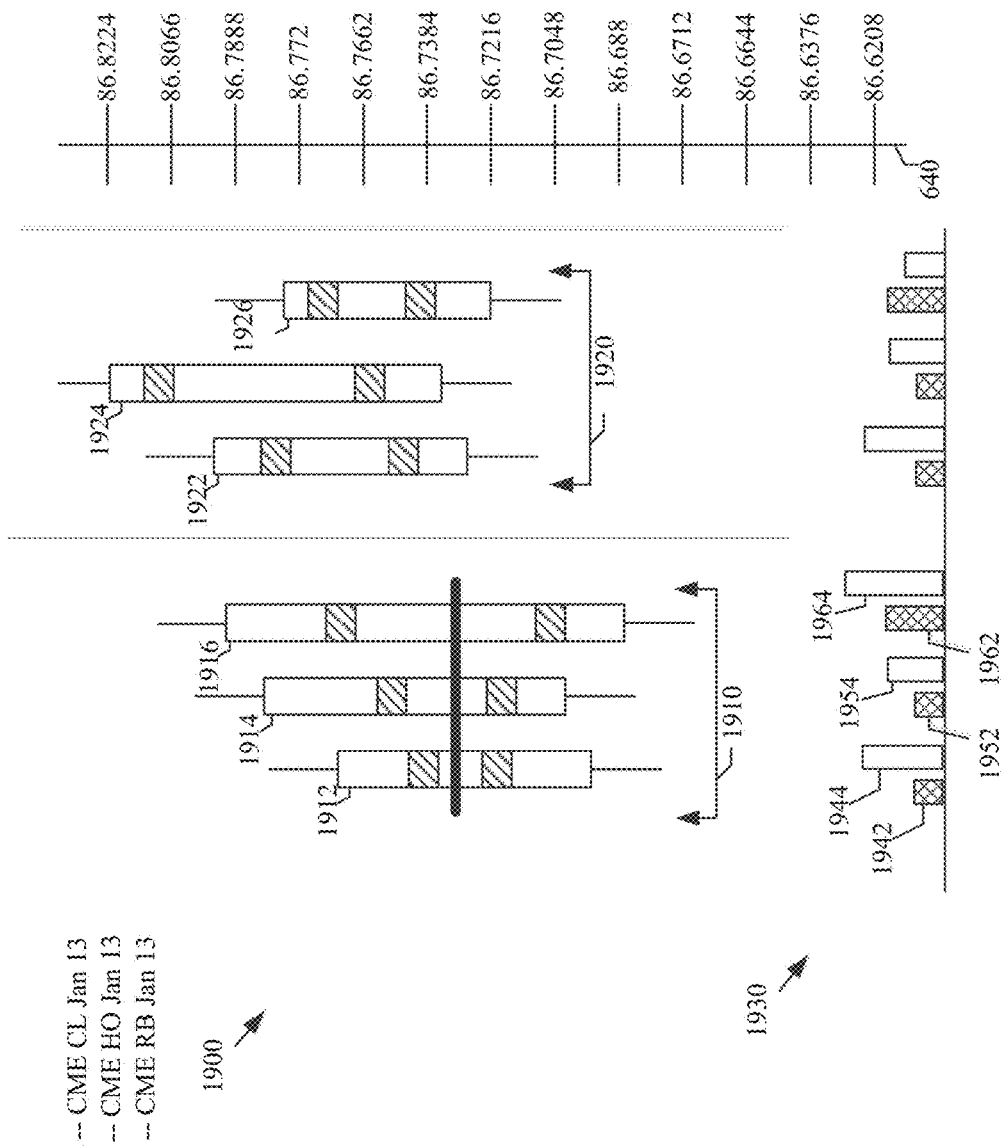
FIG. 19 illustrates an exemplary multiple market study.

FIG. 19 illustrates an exemplary multiple market study interface. FIG. 19 illustrates an exemplary relationship display 1900. The relationship display 1900 includes relationship bars 1910, 1920. The relationship display 1900 also includes a multiple market study interface 1930. The multiple market study interface 1930 includes volume traded indicators 1942, 1952, 1962 and net change indicators 1944, 1954, 1964 for each of the tradeable objects. The volume traded indicators and net change indicators, in conjunction with the layout of the relationship display, allows the volume traded and/or net change for each tradeable object to be compared (e.g., 1942 v. 1952 v. 1962) at a more granular level over a period of time. The exemplary embodiment shown in FIG. 19 may be enabled/disabled, for example, using the configuration interface 300 of FIG. 3. For example, a user may select/de-select the "vol/net change" option in the multiple market study interface 340.

Figure 20:
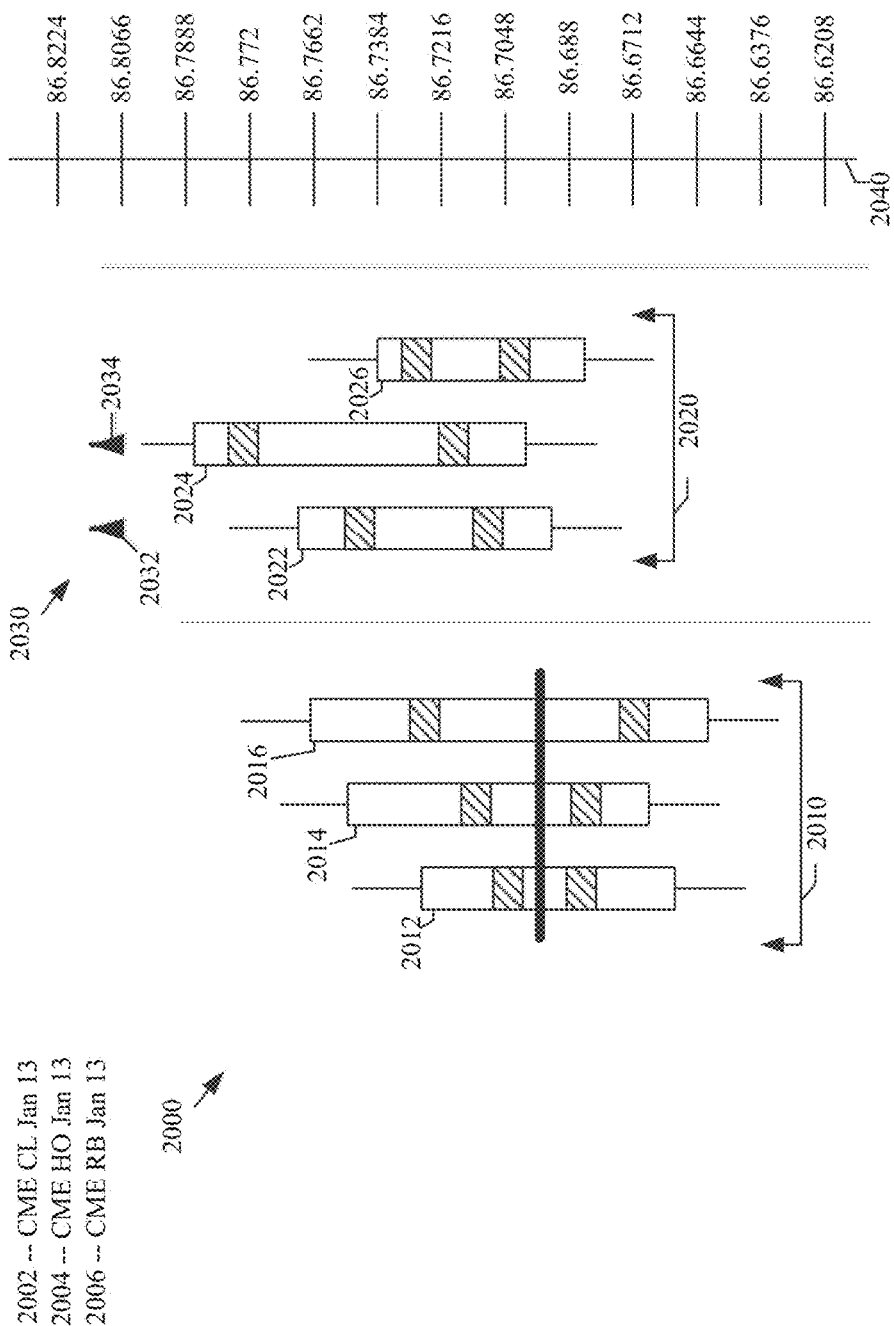
FIG. 20 illustrates another exemplary multiple market study.

FIG. 20 illustrates another exemplary multiple market study. FIG. 20 illustrates an exemplary relationship display 2000. The relationship display 2000 includes relationship bars 2010, 2020. The relationship display 2000 also includes a multiple market study interface 2030. The multiple market study interface 2030 includes new high indicators 2032, 3034 for each of the tradeable objects that is reaching a new high. The exemplary embodiment shown in FIG. 20 may be enabled/disabled, for example, using the configuration interface 300 of FIG. 3. For example, a user may select/de-select the "high-low" option in the multiple market study interface 340.

ix. Order Entry from a Relationship Display

Figure 21A:
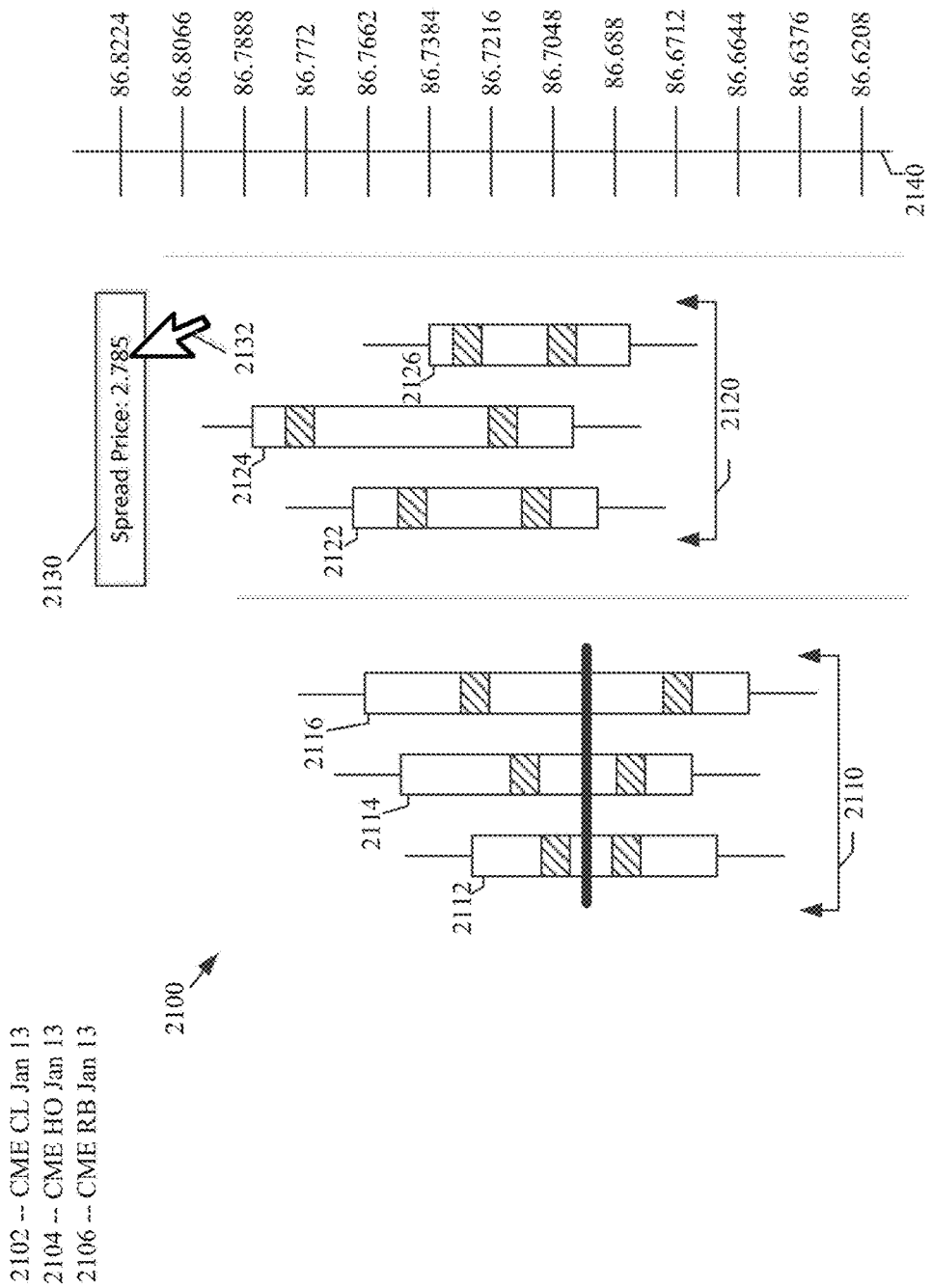
FIGS. 21A-21B illustrate examples of order entry from a relationship display.
Figure 21B:
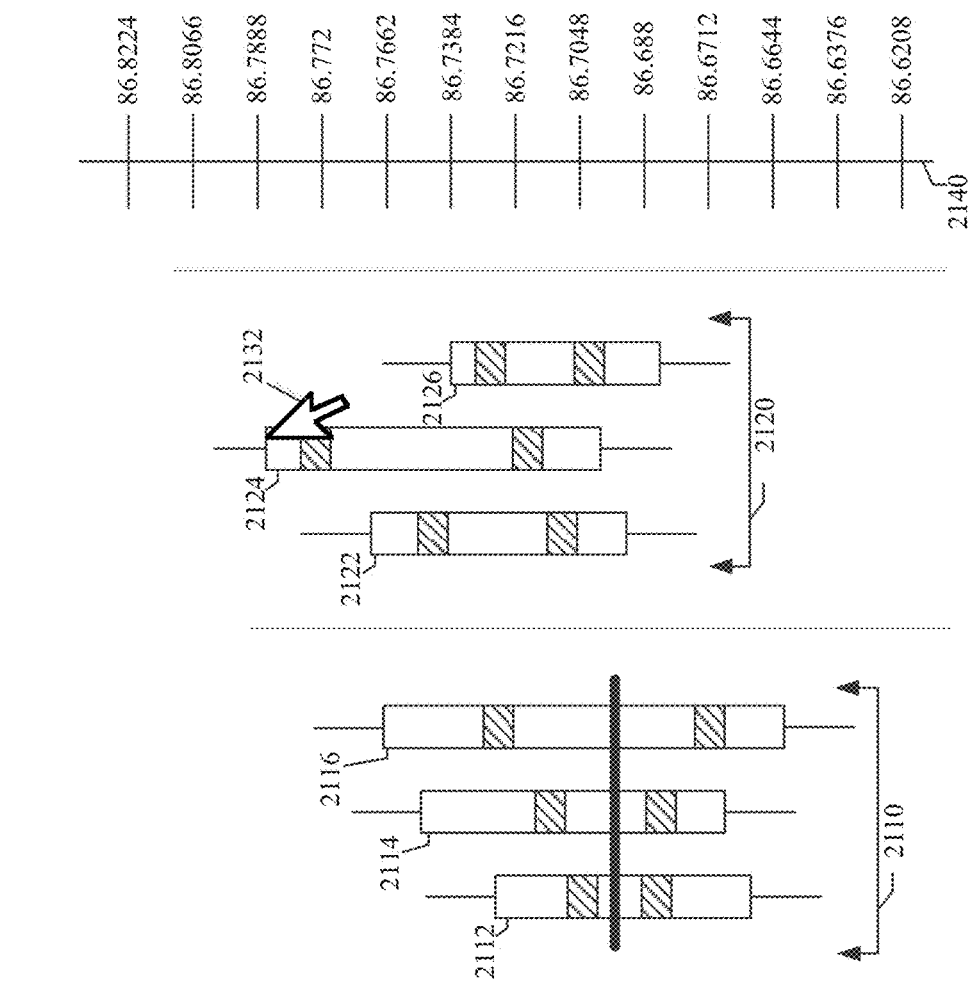

In some embodiments, one or more orders may be entered using a relationship display. FIG. 21A illustrates an example of entering an order (e.g., sending an order message to buy or sell) for a group of tradeable objects being represented by a relationship bar. FIG. 21B illustrates an example of entering an order for individual tradable objects.

In some embodiments, as shown in FIG. 21A, a user may select (e.g., click) a relationship bar indicator to place an order to buy or sell a group of tradeable objects represented by the relationship bar. For example, as shown in FIG. 21A, a relationship display 2100 may include a relationship order entry indicator 2130. Selecting the relationship order entry indicator 2130 may place an order to buy or sell the tradeable objects represented by the relationship bar.

In some embodiments, the relationship order entry indicator 2130 may include a spread price for the group of tradeable objects.

In some embodiments, selecting the relationship order entry indicator 2130 may include receiving input, for example, from an input device. For example, a user may use a mouse to move a cursor 2132 over, on top of, adjacent to, or otherwise in relationship with the relationship order entry indicator 2130 and click the mouse. Doing so may place an order for all of the tradeable objects.

In some embodiments, selecting an individual tradeable object bar may place an order for just that tradeable object bar or for the entire group of tradeable objects represented by the relationship bar. For example, as shown in FIG. 21B, a user may use a mouse to move a cursor 2132 over, on top of, adjacent to, or otherwise in relationship with a tradeable object bar (e.g., tradeable object bar 2124) and click the mouse. Doing so may place an order for the tradeable object being represented by the tradeable object bar (e.g., tradeable object 2104) or all of the tradeable objects (e.g., tradeable objects 2102-2106). The order may be placed at the corresponding price that is currently being represented.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A method including:
    receiving, using a computing device, market data for a plurality of tradeable objects, the plurality of tradeable objects including a trigger object;
    displaying, using the computing device, a bar chart including a normalized price axis;
    generating, using the computing device, a first relationship bar, wherein the first relationship bar includes a grouping of a first plurality of tradeable object bars, wherein each of the first plurality of tradeable object bars corresponds to one of the plurality of tradeable objects, wherein each of the first plurality of tradeable object bars represents the market data for the corresponding tradeable object during a first period of time;
    displaying, using the computing device, the first relationship bar on the bar chart, wherein the first plurality of tradeable object bars of the first relationship bar are plotted and move in accordance with the normalized price axis;
    detecting, using the computing device, a trigger when an occurrence of the market data for the trigger object satisfies a trigger level;
    generating, using the computing device, a second relationship bar in response to detecting the trigger, wherein the second relationship bar includes a grouping of a second plurality of tradeable object bars, wherein each of the second plurality of tradeable object bars corresponds to one of the plurality of tradeable objects, wherein each of the second plurality of tradeable object bars represents the market data for the corresponding tradeable object during a second period of time; and
    displaying, using the computing device, the second relationship bar on the bar chart, wherein the second plurality of tradeable object bars of the second relationship bar are plotted and move in accordance with the normalized price axis.

2. The method of claim 1, wherein the trigger level is non-time based.

3. The method of claim 1, wherein the first period of time does not overlap the second period of time.

4. The method of claim 1, wherein the number of the first plurality of tradeable object bars is the same as the number of the second plurality of tradeable object bars.

5. The method of claim 1, wherein the number of the first plurality of tradeable object bars is different than the number of the second plurality of tradeable object bars.

6. The method of claim 1, wherein at least one of the plurality of tradeable objects is a spread.

7. The method of claim 6, wherein the spread is a synthetic spread.

8. The method of claim 1, wherein the trigger level is time based.

9. The method of claim 1, wherein the trigger level is based on a traded volume for the trigger object.

10. The method of claim 1, wherein the trigger level is based on a net change for the trigger object.

11. The method of claim 1, wherein the plurality of tradeable objects includes a second trigger object.

12. The method of claim 1, further including:
    displaying, using the computing device, a trigger level interface that displays market data for the trigger object with a trigger level indicator, wherein the trigger level indicator indicates market data relative to the trigger level.

13. The method of claim 12, wherein the trigger level indicator is a trigger bar with the top of the bar indicating that the trigger level was satisfied.

14. The method of claim 12, wherein the trigger level interface displays market data for a second trigger object with a second trigger level indicator, wherein the second trigger level indicator indicates market data relative to a second trigger level that triggers the generation of a third relationship bar when market data satisfies the second trigger level.

15. The method of claim 14, wherein the second trigger level is the same as the trigger level.

* * * * *